United States Patent
Tanaka et al.

(10) Patent No.: US 6,853,435 B2
(45) Date of Patent: Feb. 8, 2005

(54) LIQUID CRYSTAL DISPLAY AND ITS MANUFACTURING METHOD

(75) Inventors: Yoshinori Tanaka, Osaka (JP); Shoichi Ishihara, Osaka (JP); Kenji Nakao, Osaka (JP); Keisuke Tsuda, Ishikawa (JP); Junichi Kobayashi, Ishikawa (JP); Tsuyoshi Uemura, Osaka (JP); Daiichi Suzuki, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 81 days.

(21) Appl. No.: 10/168,705
(22) PCT Filed: Oct. 23, 2001
(86) PCT No.: PCT/JP01/09276
§ 371 (c)(1),
(2), (4) Date: Sep. 25, 2002
(87) PCT Pub. No.: WO02/35283
PCT Pub. Date: May 2, 2002

(65) Prior Publication Data

US 2003/0151710 A1 Aug. 14, 2003

(30) Foreign Application Priority Data

Oct. 23, 2000 (JP) ........................................ 2000-322300
Oct. 26, 2000 (JP) ........................................ 2000-326582
Oct. 27, 2000 (JP) ........................................ 2000-328563

(51) Int. Cl.$^7$ .......................... G02F 1/137; G02F 1/1337
(52) U.S. Cl. ......................... 349/177; 349/33; 349/192; 324/770
(58) Field of Search ........................ 349/33, 177, 192, 349/129; 324/770

(56) References Cited

U.S. PATENT DOCUMENTS 5,357,358 A * 10/1994 Durand et al. .............. 349/125
5,739,884 A 4/1998 Nishi et al.
5,801,802 A * 9/1998 Inoue et al. ................ 349/129

(List continued on next page.)

FOREIGN PATENT DOCUMENTS

| EP | 0 996 028 | 4/2000 |
| EP | 1 070 981 | 1/2002 |
| JP | 2-53028 | 2/1990 |

(List continued on next page.)

OTHER PUBLICATIONS

"Cutting Edge of Liquid Crystal Display", edited by the Japanese Association of Liquid Crystal Scientists, Sigma Shuppan Co., Ltd. Tokyo, Oct. 10, 1996, pp. 105–120, 135–146.

*Primary Examiner*—Kenneth Parker
(74) *Attorney, Agent, or Firm*—Merchant & Gould P.C.

(57) ABSTRACT

A liquid crystal display includes two substrates and a liquid crystal layer sandwiched between the substrates and performs display by changing the orientation of the liquid crystal layer from a splay orientation to a bend orientation. Application of a voltage of less than a threshold voltage to the liquid crystal layer allows the liquid crystal layer to have a region where liquid crystal molecules parallel to the substrates predominantly lie on one substrate side and a region where those liquid crystal molecules predominantly lie on the other substrate side, and the two regions are present in substantially equal proportions. In a similar liquid crystal display, the absolute value of a pretilt angle of the liquid crystal molecules in the vicinity of one substrate differs from the absolute value of a pretilt angle of the liquid crystal molecules in the vicinity of the other substrate, and at least one of the substrates is provided with a bend transition nucleus induction means. As a method for making a difference between the pretilt angles, alignment films made of the same material are formed on the substrates, and then only one of the substrates is subjected to an alignment process or both substrates are subjected to the alignment process under different conditions.

13 Claims, 20 Drawing Sheets

U.S. PATENT DOCUMENTS

| | | | |
|---|---|---|---|
| 5,883,685 A | 3/1999 | Mazaki et al. | |
| 6,005,646 A * | 12/1999 | Nakamura et al. | 349/33 |
| 6,256,082 B1 | 7/2001 | Suzuki et al. | |
| 6,512,569 B1 | 1/2003 | Acosta et al. | |
| 6,542,211 B1 * | 4/2003 | Okada et al. | 349/130 |
| 6,593,987 B1 | 7/2003 | Walton et al. | |

FOREIGN PATENT DOCUMENTS

| | | |
|---|---|---|
| JP | 5-4135 | 1/1993 |
| JP | 6-317802 | 11/1994 |
| JP | 8-12759 | 1/1996 |
| JP | 9-105941 | 4/1997 |
| JP | 9-105957 | 4/1997 |
| JP | 9-146108 | 6/1997 |
| JP | 9-197397 | 7/1997 |
| JP | 9-278724 | 10/1997 |
| JP | 10-10537 | 1/1998 |
| JP | 10-20284 | 1/1998 |
| JP | 10-68949 | 3/1998 |
| JP | 10-153783 | 6/1998 |
| JP | 10-301113 | 11/1998 |
| JP | 11-7018 | 1/1999 |
| JP | 11-193345 | 7/1999 |
| JP | 11-218732 | 8/1999 |
| JP | 11-295739 | 10/1999 |
| JP | 11-352492 | 12/1999 |
| JP | 11-352524 | 12/1999 |
| JP | 2000-66208 | 3/2000 |
| JP | 2000-122099 | 4/2000 |

* cited by examiner

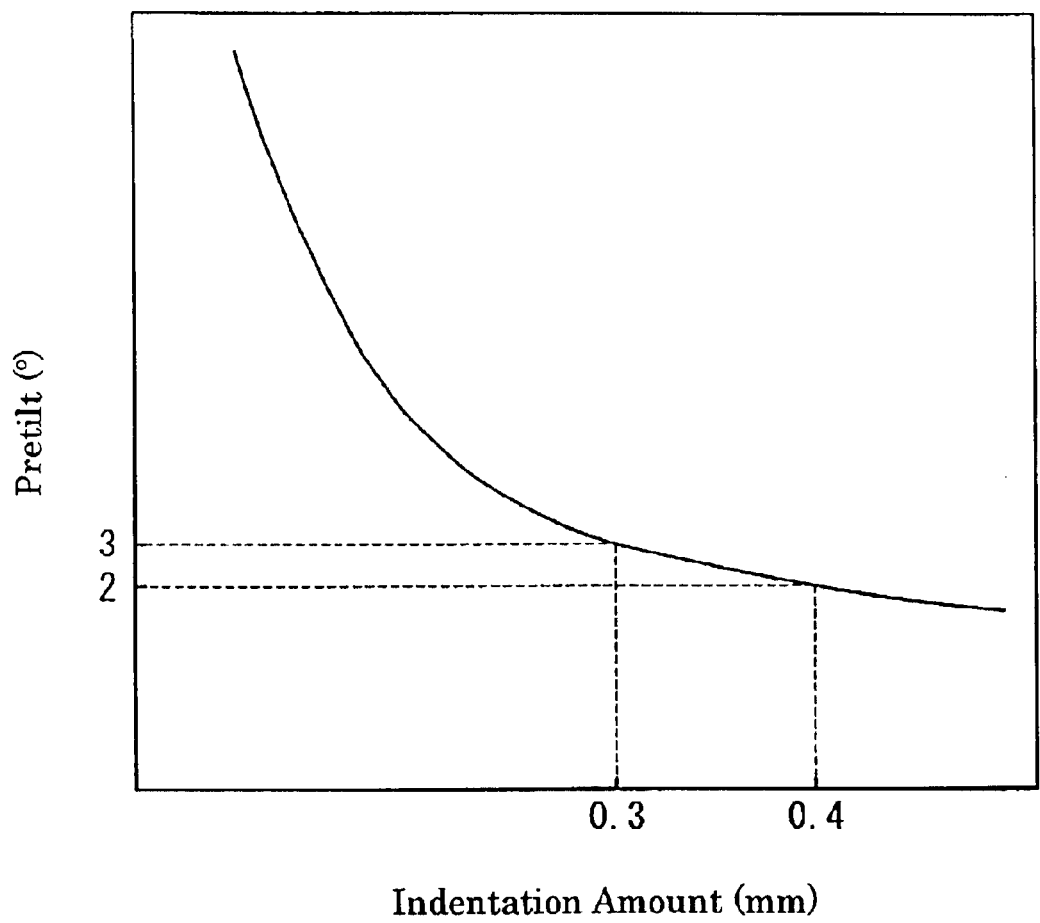
F I G. 3

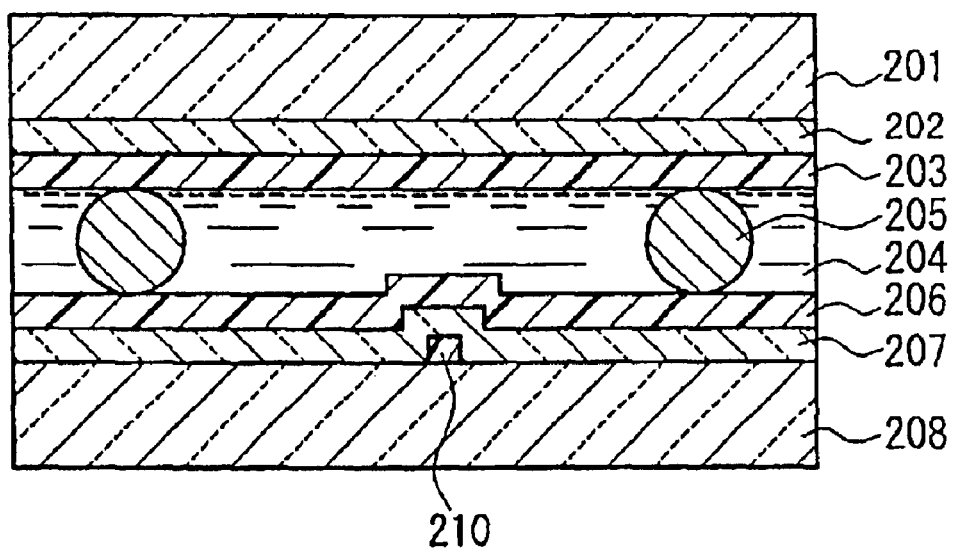
F I G. 4

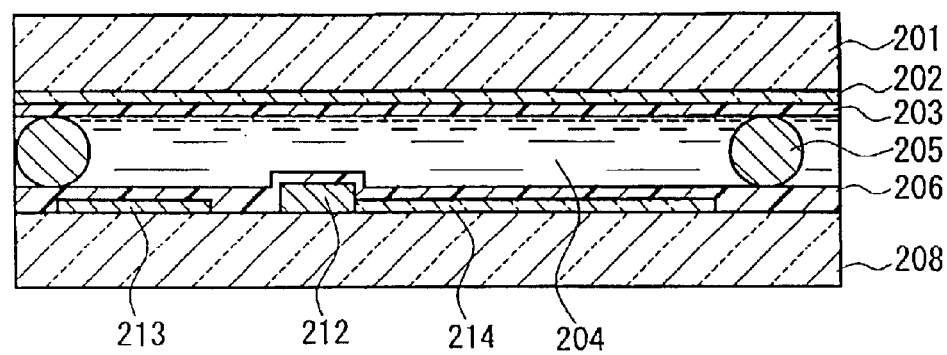
F I G. 9
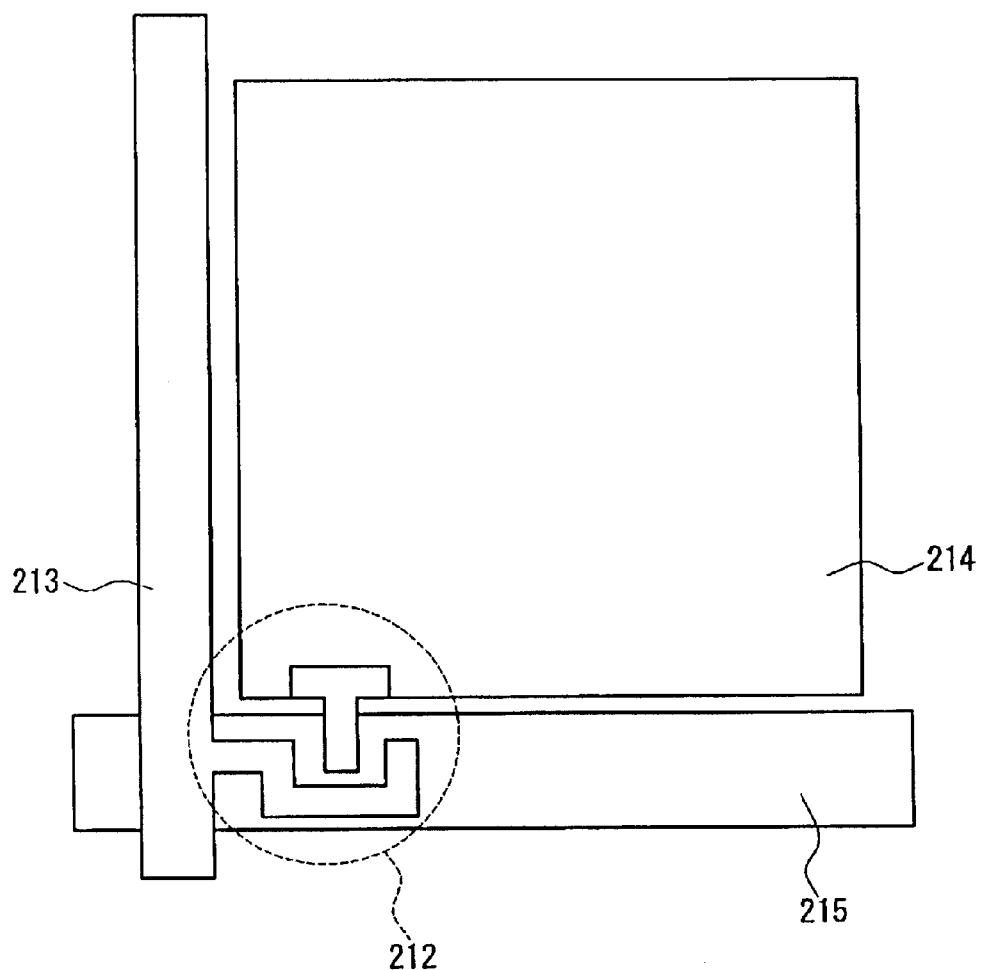
F I G. 10

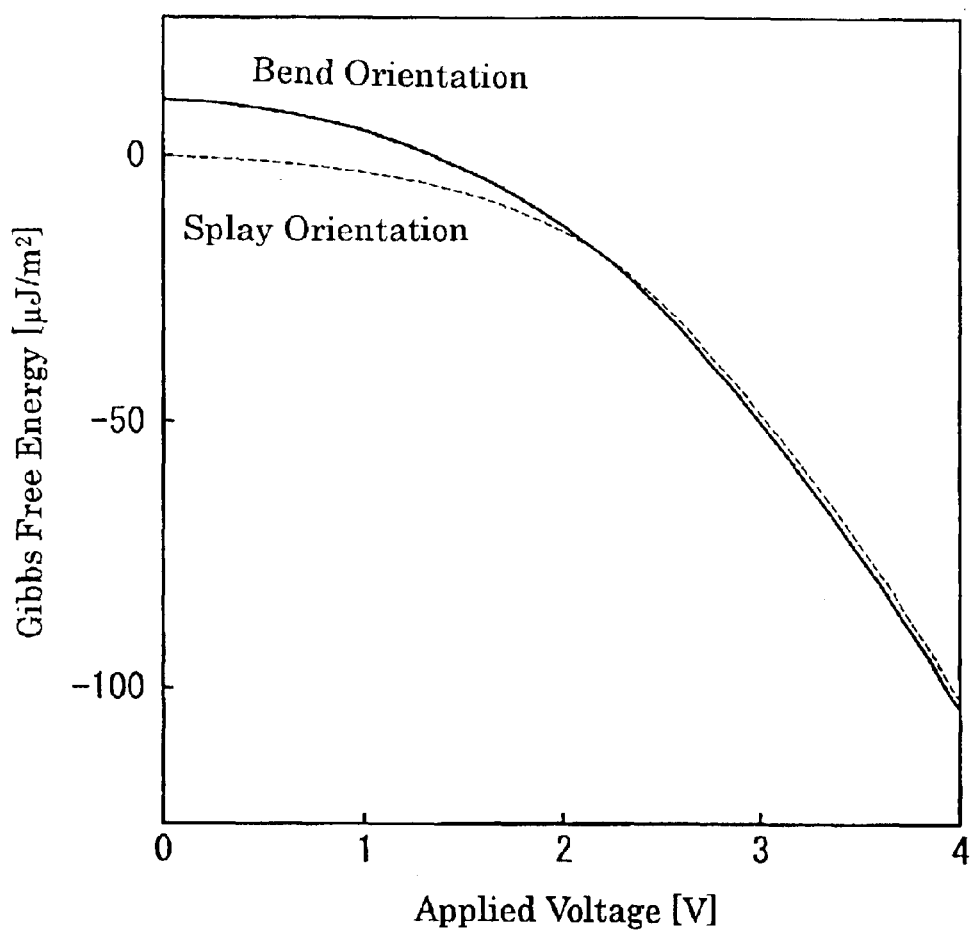
F I G. 1 7

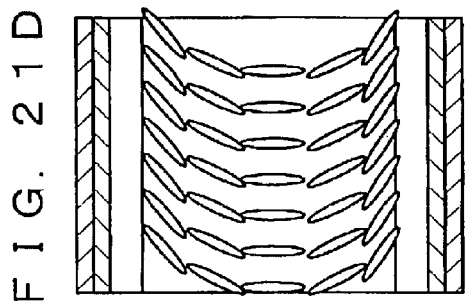
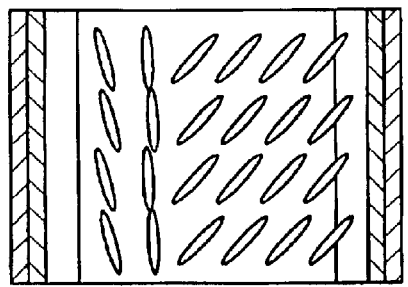
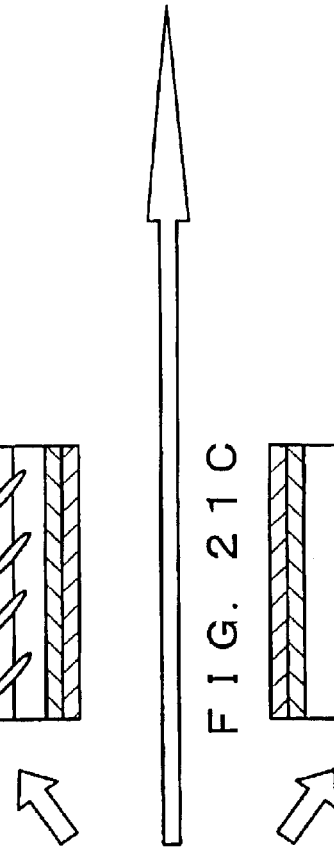
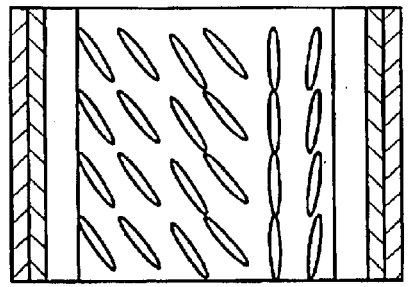
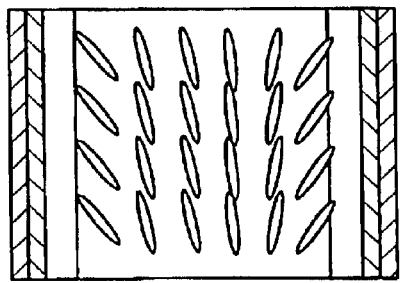

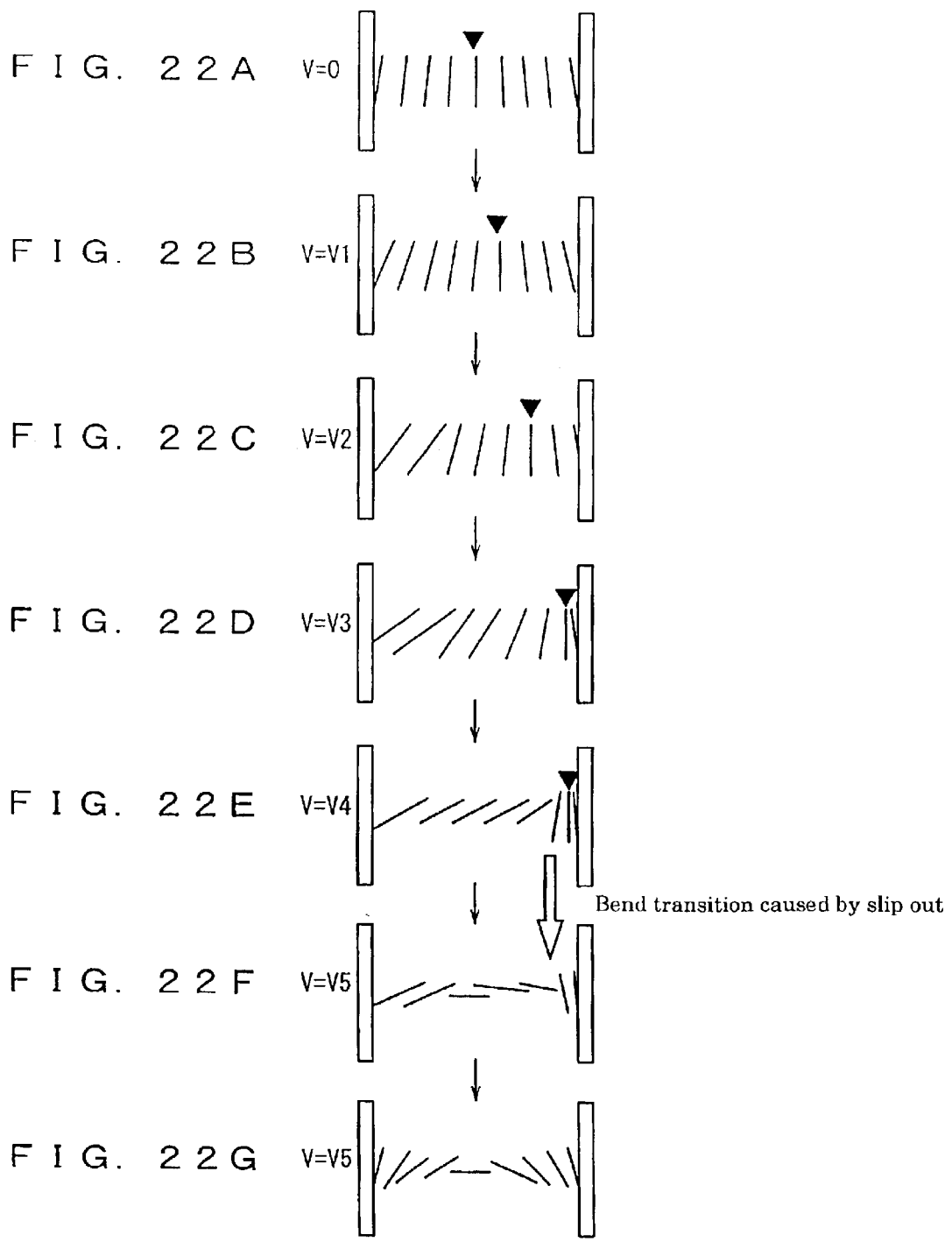

LIQUID CRYSTAL DISPLAY AND ITS MANUFACTURING METHOD

TECHNICAL FIELD

The present invention relates to a liquid crystal display having a display performance of exhibiting quick response and a wide field of view. Specifically, the present invention relates to an optically self-compensated birefringence mode (referred to as "OCB mode" in the following) liquid crystal display and a reflection-type OCB mode (referred to as "R-OCB mode" in the following) liquid crystal display.

BACKGROUND ART

A liquid crystal display is a thin, light-weight, low power display (image display) apparatus as compared with a Braun tube. Therefore, the liquid crystal display has been used in wide ranging applications including image display apparatuses such as televisions and videos, office automation (OA) equipment such as monitors, word processors and personal computers, and the display portions of cellular phones and portable terminals.

As a liquid crystal display, e.g., a twisted nematic (TN) mode liquid crystal display has been put into practical use. However, it has the disadvantages of slow response and a narrow viewing angle. Ferroelectric liquid crystals (FLC) or antiferroelectric liquid crystals (AFLC), which can provide quick response and a wide viewing angle, also have been proposed. However, there are serious disadvantages in shock resistance and temperature characteristics, and so far they have not been used widely. A display mode using polymer-dispersed liquid crystals that utilizes light scattering does not require a polarizing plate and can provide high brightness. However, it cannot control the viewing angle inherently with a phase difference plate and also has a problem of response characteristics at the moment. Thus, the polymer-dispersed liquid crystals are less superior to the TN mode liquid crystals.

In recent years, particularly with a rapid increase in information processing speed in the application field of cellular phones and portable displays, there have been demands for a motion display function in the market. To meet this demand, the OCB mode is proposed as a display mode that can achieve quick response and a wide viewing angle. The R-OCB mode also is proposed as a result of application of the OCB mode to a reflection-type mode.

FIG. 16 is a cross-sectional view showing the configuration of an OCB mode liquid crystal display. This liquid crystal display includes a substrate 401 provided with a transparent electrode 402, a substrate 408 provided with a transparent electrode 407, and a liquid crystal layer 404 sandwiched between the substrates 401, 408. Alignment films 403, 406 are formed on the transparent electrodes 402, 407, respectively. The alignment films 403, 406 are processed so that liquid crystal molecules orient parallel to one another in the same direction. Polarizing plates 413, 416 are arranged on the outer sides of the substrates 401, 408 so that their polarization axes are orthogonal to each other. Phase compensation plates 417, 418 are interposed between the polarizing plate 413 and the substrate 401 and between the polarizing plate 416 and the substrate 408, respectively.

In the OCB mode liquid crystal display, when the liquid crystal layer is in the initial state (i.e., no voltage is applied), it has a splay orientation 4a. The application of a voltage induces a bend orientation 4b or a bend orientation including a twisted orientation in the liquid crystal layer, and display is performed in this bend orientation state.

However, it takes a long time for a transition from the splay orientation to the bend orientation in a conventional OCB mode liquid crystal display, which has been a major obstacle to its practical use. The transition is performed generally by applying a high voltage across the opposed electrodes. Though the transition time becomes shorter with increasing voltage, a higher voltage cannot be applied readily because of the withstand voltage of an IC driving voltage. Therefore, the transition should be performed while applying a voltage of about several to 30 V. With the application of several volts, however, a period of time in minutes is required to complete the transition.

FIG. 23 is a cross-sectional view showing the configuration of a R-OCB mode liquid crystal display. This liquid crystal display includes a substrate 501 provided with a transparent electrode 502, a substrate 508 provided with a transparent electrode 507, and a liquid crystal layer 504 sandwiched between the substrates 501, 508. Alignment films 503, 506 are formed on the transparent electrodes 502, 507, respectively. A horizontal alignment film is used as the alignment film 503, and a vertical alignment film is used as the alignment film 506. Polarizing plates 513, 516 are arranged on the outer sides of the substrates 501, 508 so that their polarization axes are orthogonal to each other. Phase compensation plates 517, 518 are interposed between the polarizing plate 513 and the substrate 501 and between the polarizing plate 516 and the substrate 508, respectively. A reflecting plate (not shown) is arranged on the inner or outer surface of the substrate 508.

In the R-OCB mode liquid crystal display, when the liquid crystal layer is in the initial state (i.e., no voltage is applied), the liquid crystal molecules on one substrate side orient perpendicular to the substrate surface and those on the other substrate side orient parallel to the substrate surface. For display, the liquid crystal molecules in the central portion of the liquid crystal layer should be controlled so as to align perpendicular to the substrates by applying a voltage. However, unlike the OCB mode, the transition process is not necessary because the pretilt angle of the liquid crystal molecules at one substrate differs from that of the liquid crystal molecules at the other substrate.

As described above, the orientations of the liquid crystal molecules at the two substrates should differ in a conventional R-OCB mode liquid crystal display. Therefore, different types of alignment films are used for the respective substrates: the horizontal alignment film as the alignment film 3 and the vertical alignment film as the alignment film 6. Consequently, electrical asymmetry occurs between the substrates. This leads to nonuniform display density and a residual image caused when the same image is displayed for a long time even under the normal operating conditions. Thus, the display quality is degraded considerably.

It is an object of the present invention to achieve a quick transition from the splay orientation to the bend orientation by applying a relatively low voltage in an OCB mode liquid crystal display.

It is another object of the present invention to reduce electrical asymmetry between the substrates and improve the display quality of a liquid crystal display in which the pretilt angle at one substrate differs from that at the other substrate, such as a R-OCB mode liquid crystal display.

DISCLOSURE OF INVENTION

To achieve the first object, a first liquid crystal display of the present invention includes two opposed substrates and a liquid crystal layer sandwiched between the substrates. The liquid crystal layer includes liquid crystal molecules whose orientation is changed from a splay orientation to a bend orientation for display by applying a voltage of not less than a threshold voltage to the liquid crystal layer. Application of a voltage of less than the threshold voltage to the liquid crystal layer allows the liquid crystal layer to have a region where the liquid crystal molecules having a molecular axis parallel to the substrates predominantly lie on one substrate side with respect to a central portion of the liquid crystal layer and a region where those liquid crystal molecules predominantly lie on the other substrate side with respect to the central portion, and the two regions are present in substantially equal proportions.

In the first liquid crystal display, an area ratio can be used to evaluate whether "the two regions are present in substantially equal proportions." For example, the area ratio (U:D) of the region (U) where the liquid crystal molecules having the molecular axis parallel to the substrates predominantly lie on one substrate side with respect to the central portion of the liquid crystal layer to the region (D) where those liquid crystal molecules predominantly lie on the other substrate side with respect to the central portion is 40:60 to 60:40.

To achieve the first object, a second liquid crystal display of the present invention includes two opposed substrates and a liquid crystal layer sandwiched between the substrates. The liquid crystal layer includes liquid crystal molecules whose orientation is changed from a splay orientation to a bend orientation for display by applying a voltage of not less than a threshold voltage to the liquid crystal layer. A difference in absolute value between a pretilt angle of the liquid crystal molecules in the vicinity of one substrate and a pretilt angle of the liquid crystal molecules in the vicinity of the other substrate is not more than 0.7 degrees.

In the second liquid crystal display, it is preferable that both absolute values of the pretilt angles of the liquid crystal molecules in the vicinity of one substrate and in the vicinity of the other substrate are not more than 4 degrees.

To achieve the first object, a third liquid crystal display of the present invention includes two opposed substrates and a liquid crystal layer sandwiched between the substrates. The liquid crystal layer includes liquid crystal molecules whose orientation is changed from a splay orientation to a bend orientation for display by applying a voltage of not less than a threshold voltage to the liquid crystal layer. Both absolute values of pretilt angles of the liquid crystal molecules in the vicinity of one substrate and in the vicinity of the other substrate are not more than 4 degrees.

In the first to third liquid crystal displays, it is preferable that at least one of the substrates is provided with a bend transition nucleus induction means. As the bend transition nucleus induction means, a means for generating a twisted orientation in a portion of the liquid crystal layer can be used. Examples of the bend transition nucleus induction means further include a convex structure such as a spherical structure and a columnar structure, a concave structure, an electric field application means for applying a transverse electric field to the liquid crystal layer, and an alignment film containing asymmetric carbon atoms. A nonlinear element formed on the substrate also can be used as the bend transition nucleus induction means.

It is preferable that each of the first to third liquid crystal displays is an OCB-type liquid crystal display.

To achieve the first object, a first manufacturing method of the present invention is a method for manufacturing a liquid crystal display that includes two opposed substrates and a liquid crystal layer sandwiched between the substrates, the liquid crystal layer including liquid crystal molecules whose orientation is changed from a splay orientation to a bend orientation for display by applying a voltage of not less than a threshold voltage to the liquid crystal layer. The method includes rubbing the surfaces of the substrates to be in contact with the liquid crystal layer. A rubbing density of the rubbing process is not less than 20000 $mm^2$.

In the first manufacturing method, it is preferable that the amount of indentation in the rubbing process is not less than 0.3 mm.

To achieve the first object, a second manufacturing method of the present invention is a method for manufacturing a liquid crystal display that includes two opposed substrates and a liquid crystal layer sandwiched between the substrates, the liquid crystal layer including liquid crystal molecules whose orientation is changed from a splay orientation to a bend orientation for display by applying a voltage of not less than a threshold voltage to the liquid crystal layer. The method includes forming an alignment film precursor on the surfaces of the substrates to be in contact with the liquid crystal layer, and firing the alignment film precursor to produce an alignment film. The alignment film can reduce a variation in pretilt angle of the liquid crystal molecules in contact with the alignment film to not more than 0.5 degrees when a firing temperature is changed by 20%.

To achieve the first object, a third manufacturing method of the present invention is a method for manufacturing a liquid crystal display that includes two opposed substrates and a liquid crystal layer sandwiched between the substrates, the liquid crystal layer including liquid crystal molecules whose orientation is changed from a splay orientation to a bend orientation for display by applying a voltage of not less than a threshold voltage to the liquid crystal layer. The method includes an inspection process after producing the liquid crystal display. The inspection process is performed by applying a voltage of less than the threshold voltage to the liquid crystal layer and evaluating an area ratio of a region where the liquid crystal molecules having a molecular axis parallel to the substrates predominantly lie on one substrate side with respect to a central portion of the liquid crystal layer to a region where those liquid crystal molecules predominantly lie on the other substrate side with respect to the central portion.

In the third manufacturing method, a liquid crystal display having a substantially equal area ratio can be recognized as an acceptable product in the inspection process.

In the first to third manufacturing methods, it is preferable that each of the liquid crystal displays is an OCB-type liquid crystal display.

To achieve the first object, a fourth liquid crystal display of the present invention includes a first substrate, a second substrate, and a liquid crystal layer sandwiched between the first substrate and the second substrate. The first substrate and the second substrate are opposed to each other, and the liquid crystal layer includes liquid crystal molecules whose orientation is changed from a splay orientation to a bend orientation for display by applying a voltage of not less than a threshold voltage to the liquid crystal layer. The absolute value of a pretilt angle of the liquid crystal molecules in the vicinity of the first substrate differs from the absolute value of a pretilt angle of the liquid crystal molecules in the vicinity of the second substrate, and at least one of the first substrate and the second substrate is provided with a bend transition nucleus induction means.

In the fourth liquid crystal display, it is preferable that the absolute value of the pretilt angle of the liquid crystal molecules in the vicinity of the first substrate is smaller than the absolute value of the pretilt angle of the liquid crystal molecules in the vicinity of the second substrate, and the first substrate is provided with the bend transition nucleus induction means.

In the fourth liquid crystal display, it is preferable that a region that includes the liquid crystal molecules having a molecular axis parallel to the substrates is located predominantly on the first substrate side with respect to a central portion of the liquid crystal layer when a voltage of less than the threshold voltage is applied to the liquid crystal layer.

In the fourth liquid crystal display, it is preferable that a difference in absolute value between the pretilt angle of the liquid crystal molecules in the vicinity of the first substrate and the pretilt angle of the liquid crystal molecules in the vicinity of the second substrate is 0.5 to 3 degrees.

In the fourth liquid crystal display, a means for generating a twisted orientation in a portion of the liquid crystal layer can be used as the bend transition nucleus induction means. Examples of the bend transition nucleus induction means further include a convex structure such as a spherical structure and a columnar structure, a concave structure, an electric field application means for applying a transverse electric field to the liquid crystal layer, and an alignment film containing asymmetric carbon atoms. A nonlinear element for driving pixels that is formed on the substrate also can be used as the bend transition nucleus induction means.

To achieve the first object, a fifth liquid crystal display of the present invention includes a first substrate, a second substrate, and a liquid crystal layer sandwiched between the first substrate and the second substrate. The first substrate and the second substrate are opposed to each other, and the liquid crystal layer includes liquid crystal molecules whose orientation is changed from a splay orientation to a bend orientation for display by applying a voltage to the liquid crystal layer. The absolute value of a pretilt angle of the liquid crystal molecules in the vicinity of the first substrate differs from the absolute value of a pretilt angle of the liquid crystal molecules in the vicinity of the second substrate. A twist elastic constant $k_{22}$ of a liquid crystal material for the liquid crystal layer is not more than 10 pN.

It is preferable that each of the fourth and fifth liquid crystal displays is an OCB-type liquid crystal display.

To achieve the second object, a sixth liquid crystal display of the present invention includes the following: a first substrate; a second substrate; a liquid crystal layer sandwiched between the first substrate and the second substrate; a first alignment film formed on the surface of the first substrate to be in contact with the liquid crystal layer; and a second alignment film formed on the surface of the second substrate to be in contact with the liquid crystal layer. The first substrate and the second substrate are opposed to each other. The first alignment film and the second alignment film are formed with the same material. The absolute value of a pretilt angle of liquid crystal molecules in the vicinity of the first substrate differs from the absolute value of a pretilt angle of liquid crystal molecules in the vicinity of the second substrate.

It is preferable that the sixth liquid crystal display is a R-OCB-type liquid crystal display.

To achieve the second object, a fourth manufacturing method of the present invention is a method for manufacturing a liquid crystal display that includes opposed first and second substrates and a liquid crystal layer sandwiched between the first substrate and the second substrate. The absolute value of a pretilt angle of liquid crystal molecules in the vicinity of the first substrate differs from the absolute value of a pretilt angle of liquid crystal molecules in the vicinity of the second substrate. The method includes forming a first alignment film on the surface of the first substrate to be in contact with the liquid crystal layer and a second alignment film made of the same material as that of the first alignment film on the surface of the second substrate to be in contact with the liquid crystal layer, and performing an alignment process on at least one of the first alignment film and the second alignment film so as to make a difference in pretilt angle control characteristics between the first alignment film and the second alignment film.

Here, "a difference in pretilt angle control characteristics" indicates the state in which the pretilt angle of the liquid crystal molecules in the vicinity of the first alignment film differs from the pretilt angle of the liquid crystal molecules in the vicinity of the second alignment film.

In the fourth manufacturing method, a rubbing process may be performed as the alignment process. In this case, only one of the first alignment film and the second alignment film may be rubbed. Alternatively, both the first alignment film and the second alignment film may be rubbed so that there is a difference in rubbing strength between the first alignment film and the second alignment film.

In the fourth manufacturing method, a water-repellent treatment may be performed as the alignment process. In this case, only one of the first alignment film and the second alignment film may have water-repellent treatment.

In the fourth manufacturing method, ultraviolet irradiation may be performed as the alignment process. In this case, only one of the first alignment film and the second alignment film may be irradiated with ultraviolet rays. Alternatively, both the first alignment film and the second alignment film may be irradiated with ultraviolet rays so that there is a difference in at least one of intensity and time of the irradiation between the first alignment film and the second alignment film.

In the fourth manufacturing method, the alignment process may include a rubbing process and ultraviolet irradiation after the rubbing process.

In the fourth manufacturing method, a polyimide alignment film, a monomolecular optical alignment film, an obliquely evaporated film, or the like may be used as the first alignment film and the second alignment film.

To achieve the second object, a fifth manufacturing method of the present invention is a method for manufacturing a liquid crystal display that includes opposed first and second substrates and a liquid crystal layer sandwiched between the first substrate and the second substrate. The absolute value of a pretilt angle of liquid crystal molecules in the vicinity of the first substrate differs from the absolute value of a pretilt angle of liquid crystal molecules in the vicinity of the second substrate. The method includes forming a first alignment film by forming a polyimide alignment film precursor on the surface of the first substrate to be in contact with the liquid crystal layer and firing the polyimide alignment film precursor, and forming a second alignment film by forming a precursor made of the same material as that of the polyimide alignment film precursor on the surface of the second substrate to be in contact with the liquid crystal layer and firing the precursor. A firing temperature for the first alignment film differs from a firing temperature for the second alignment film.

In the fourth and fifth manufacturing methods, it is preferable that each of the liquid crystal displays is a R-OCB-type liquid crystal display.

To achieve the second object, a seventh liquid crystal display of the present invention includes the following: a first substrate; a second substrate; a liquid crystal layer sandwiched between the first substrate and the second substrate; a first alignment film formed on the surface of the first substrate to be in contact with the liquid crystal layer; and a second alignment film formed on the surface of the second substrate to be in contact with the liquid crystal layer. The first substrate and the second substrate are opposed to each other. The first alignment film and the second alignment film are formed with different materials. The dielectric constant of the first alignment film is larger than the dielectric constant of the second alignment film, and the thickness of the first alignment film is smaller than the thickness of the second alignment film.

To achieve the second object, a eighth liquid crystal display of the present invention includes the following: a first substrate; a second substrate; a liquid crystal layer sandwiched between the first substrate and the second substrate; a first alignment film formed on the surface of the first substrate to be in contact with the liquid crystal layer; and a second alignment film formed on the surface of the second substrate to be in contact with the liquid crystal layer. The first substrate and the second substrate are opposed to each other. The first alignment film and the second alignment film are formed with different materials. An insulating film is provided below at least one of the first alignment film and the second alignment film.

In the seventh and eighth liquid crystal displays, it is preferable that the amount of polarization of the liquid crystal molecules on the first substrate is equal to the amount of polarization of the liquid crystal molecules on the second substrate.

Here, "the amount of polarization" includes a charge caused by the ions in liquid crystals that are absorbed on the alignment films and a surface charge caused by the arrangement of dielectric polarization in the alignment films. A DC bias is applied to the liquid crystals because of this amount of polarization, causing asymmetry in the response characteristics of the liquid crystals. To quantify the amount of polarization, a DC bias voltage of the opposite polarity is applied to the liquid crystals, thereby achieving symmetry in the characteristics. This DC bias voltage can be used to evaluate the amount of polarization. An electric charge Q per unit area is expressed simply by Q=CV, where C is a capacitance of liquid crystals per unit area and V is a DC voltage required to achieve the symmetry as described above.

It is preferable that each of the seventh and eighth liquid crystal displays is a R-OCB-type liquid crystal display.

BRIEF DESCRIPTION OF DRAWINGS

FIG. 3 shows the relationship between the strength of rubbing process on an alignment film and a pretilt angle in a liquid crystal display of Embodiment 1-1.

FIG. 4 is a cross-sectional view showing an example of a liquid crystal display of Embodiment 1-2.

FIG. 9 is a cross-sectional view showing an example of a liquid crystal display of Embodiment 1-3.

FIG. 10 is a plan view showing the arrangement of a pixel electrode and various wirings on a first substrate of a liquid crystal display of Embodiment 1-3.

FIG. 17 is a conceptual diagram illustrating the dependence of Gibbs free energy for a splay orientation and a bend orientation upon an applied voltage.

FIGS. 21A to 21D are conceptual diagrams illustrating the movement of a liquid crystal director from a splay orientation to a bend orientation in an OCB-type liquid crystal display.

FIGS. 22A to 22G are conceptual diagrams illustrating the movement of a liquid crystal director from a splay orientation to a bend orientation in an OCB-type liquid crystal display.

BEST MODE FOR CARRYING OUT THE INVENTION

First Embodiment

A liquid crystal display according to an embodiment of the present invention includes a liquid crystal layer sandwiched between two substrates. By applying a voltage to the liquid crystal layer, its orientation is changed from a splay orientation to a bend orientation, thus performing display. Examples of such a liquid crystal display include an OCB-type liquid crystal display.

The present inventors conducted detailed studies on the splay-bend transition mechanism in the liquid crystal display. The results shown in FIGS. 17 to 20 are obtained when a liquid crystal material has a relative dielectric constant $\in$ (parallel) of 12.3, $\in$ (vertical) of 4.5, an elastic constant k11 of $8.8 \times 10^{-12}$ pN, k22 of $7.5 \times 10^{-12}$ pN, and k33 of $1.42 \times 10^{31}$ 11 pN. The thickness of the liquid crystal layer is 5.3 μm, the pretilt angles with respect to a first substrate and a second substrate are 3 degrees, and the surface anchoring strength is $5 \times 10^{-4}$ J/m$^2$.

FIG. 17 plots the Gibbs free energy for the splay orientation and the bend orientation versus an applied voltage. As shown in FIG. 17, when the applied voltage is not less than a specific value (e.g., 2.4 V in FIG. 17), the bend orientation is more stable than the splay orientation.

Figure 18:
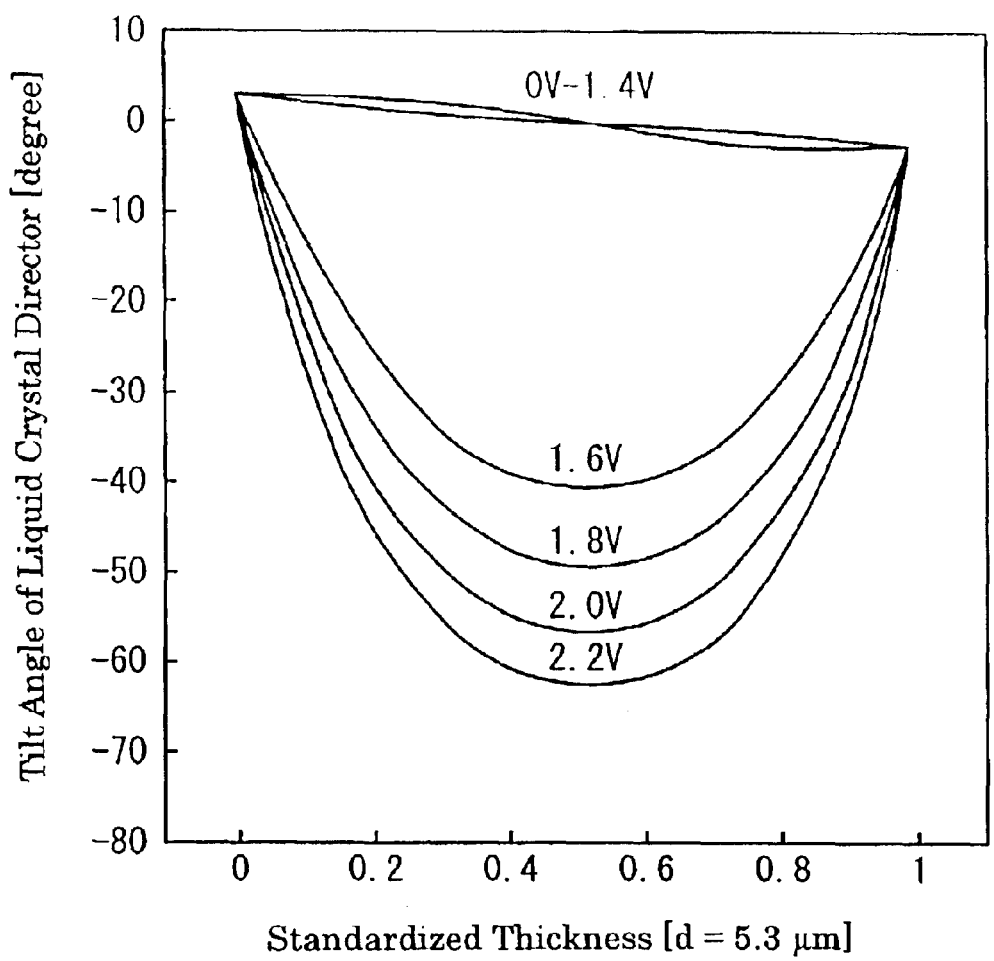
FIG. 18 is a conceptual diagram illustrating the voltage dependence of liquid crystal director distribution when a liquid crystal layer has a splay orientation.

FIG. 18 shows the voltage dependence of liquid crystal director distribution that corresponds to the splay orientation. When the applied voltage is relatively low (e.g., 1.4 V or less in FIG. 18), the liquid crystal molecules in the central portion of the liquid crystal layer align parallel to the substrates. When the applied voltage is relatively high (e.g., 1.6 V or more in FIG. 18), the liquid crystal molecules parallel to the substrates are in the vicinity of one of the substrates to produce the state of energy concentration.

Figure 19:
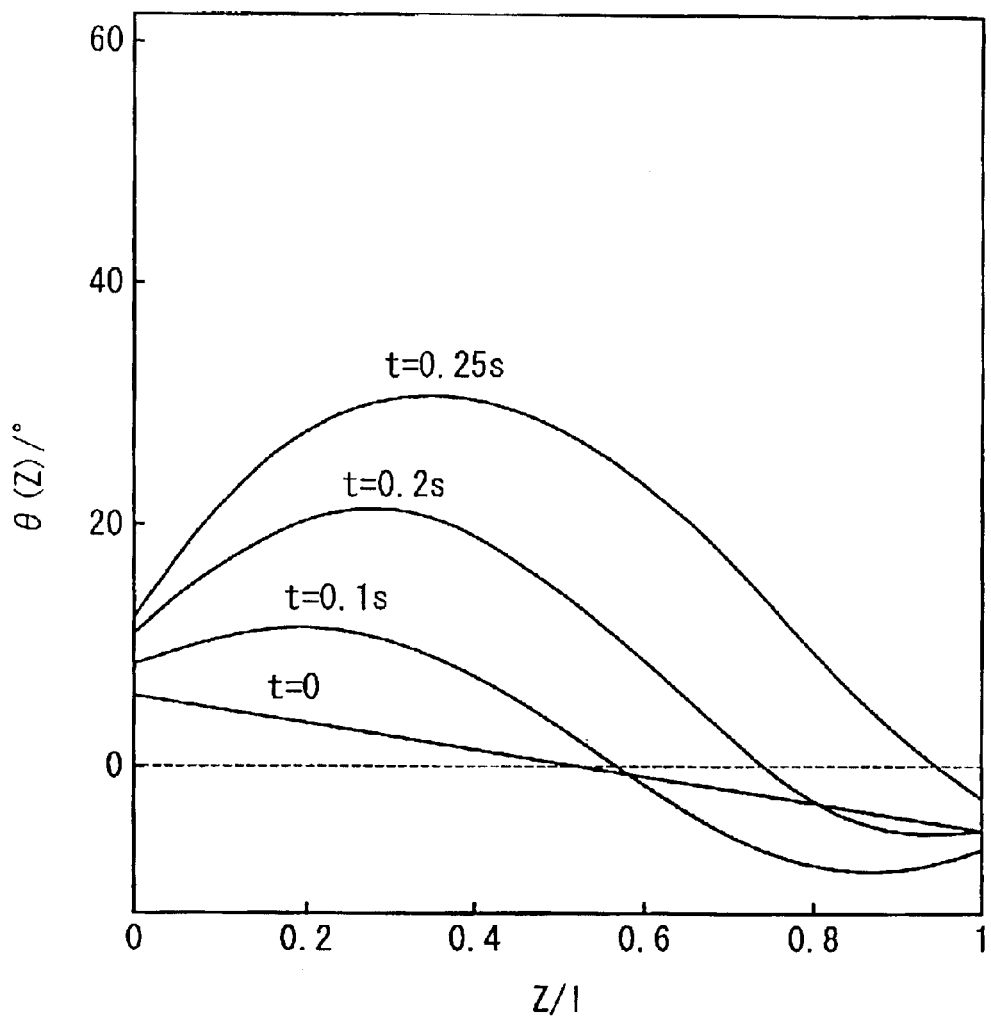
FIG. 19 is a conceptual diagram illustrating a change in liquid crystal director distribution with time when a voltage is applied to a liquid crystal layer that has a splay orientation.

FIG. 19 shows an example of a change in the director distribution with time immediately after the application of a voltage. As shown in FIG. 19, the position of the liquid crystal molecules parallel to the substrates, i.e., the liquid crystal molecules having a tilt angle of zero, shifts to one of the substrate sides with time by applying a voltage.

Figure 20:
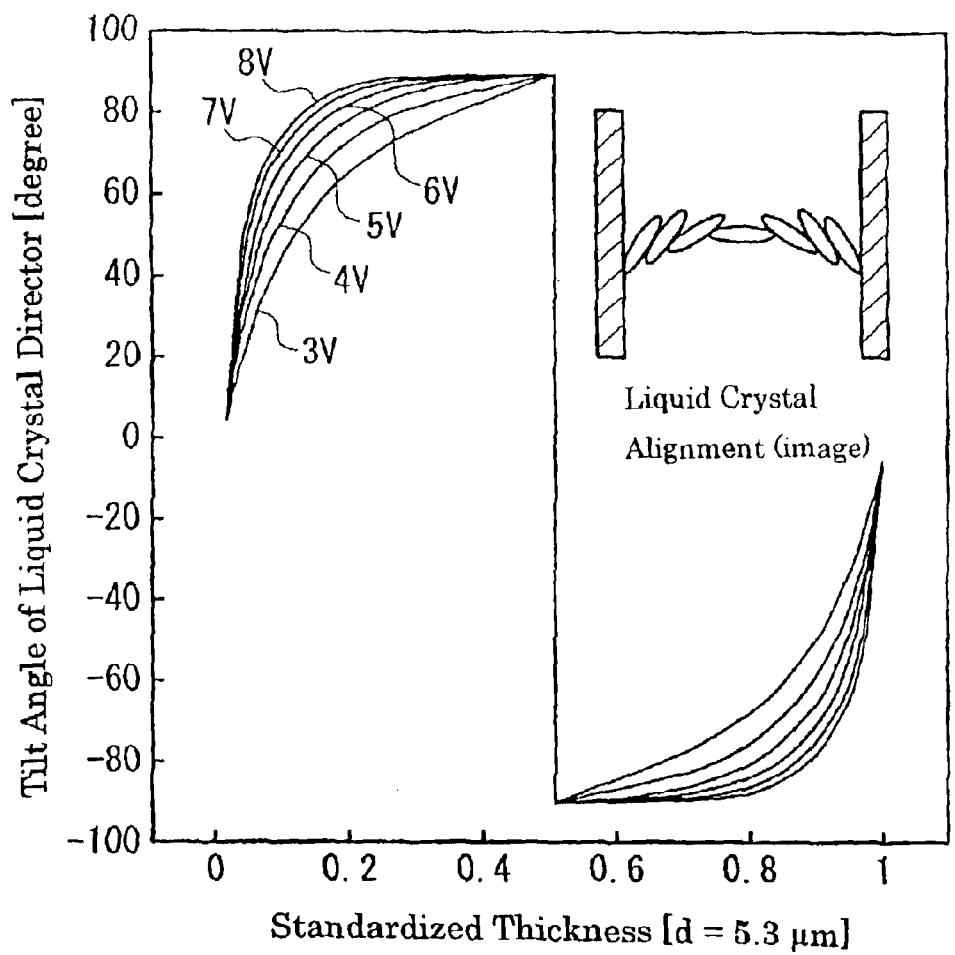
FIG. 20 is a conceptual diagram illustrating the voltage dependence of liquid crystal director distribution when a liquid crystal layer has a bend orientation.
Figure 23:
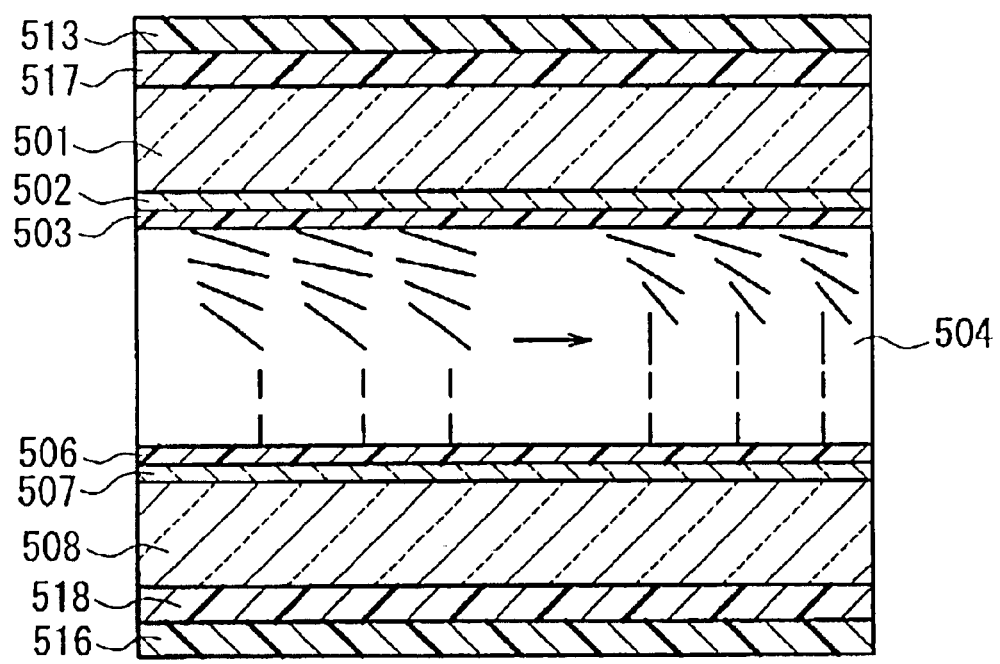
FIG. 23 is a cross-sectional view showing an example of the configuration of a R-OCB-type liquid crystal display.

FIG. 20 shows the liquid crystal director distribution when a voltage of not less than a threshold voltage (e.g., 3.0 V or more) is applied, together with an image of liquid crystal alignment. The liquid crystal director distribution corresponds to the bend orientation.

The following is an explanation of the splay-bend transition mechanism based on the above results.

FIGS. 21A to 21D are schematic diagrams illustrating a process of forming the bend orientation by applying an initialization voltage to the liquid crystal display that shows the splay orientation. When the liquid crystal layer is in the initial state (i.e., no voltage is applied), it has the splay orientation (FIG. 21A). In the splay orientation, the inclination of a molecular axis of the individual liquid crystal molecules with respect to the substrate plane, i.e., a tilt angle, is small throughout the liquid crystal layer. Thus, the molecular axis of the liquid crystal molecules in the central portion of the liquid crystal layer is substantially parallel to the substrate planes. In other words, a portion that includes the liquid crystal molecules having the molecular axis parallel to the substrate planes is in the central portion of the liquid crystal layer. There is almost no twisted structure in the entire liquid crystal layer, so that the liquid crystal orientation is symmetrical substantially in the vertical direction of the liquid crystal layer.

When a voltage of not less than a threshold voltage is applied to this liquid crystal layer in the direction perpendicular to the substrate planes, the bend orientation occurs in a specific portion to generate a bend transition nucleus (FIG. 21D). In the bend orientation, the inclination of the molecular axis of the individual liquid crystal molecules with respect to the substrate plane, i.e., a tilt angle, is small in the vicinity of each substrate surface. However, the absolute value of the tilt angle of the liquid crystal molecules in the central portion of the liquid crystal layer is large, and thus these liquid crystal molecules align substantially perpendicular to the substrate planes. There is almost no twisted structure in the entire liquid crystal layer.

In a region other than the region where the bend transition nucleus is generated, the splay orientation is changed into the state in which a portion including the liquid crystal molecules substantially parallel to the substrate planes shifts to one of the substrate sides (FIGS. 21B and 21C). This phenomenon occurs in both of the substrate sides. That is, as shown in the drawings, the shift of the portion including the liquid crystal molecules substantially parallel to the substrate planes produces two different states, which are referred to as an up-splay state (FIG. 21B) and a down-splay state (FIG. 21C) in the following.

In the transition process from the splay orientation to the bend orientation through the up-splay or down-splay state, the liquid crystal director distribution of a liquid crystal display gradually varies in state.

FIGS. 22A to 22G are schematic diagrams illustrating the movement of a liquid crystal director in the liquid crystal layer when the applied voltage changes $0 \to V1 \to V2 \to V3 \to V4 \to V5 \to (0 < V1 < V2 < V3 < V4 < V5)$. In FIGS. 22A to 22G, a black triangle indicates the position of a portion that includes the liquid crystal molecules having the molecular axis parallel to the substrate planes.

FIG. 22A schematically shows the orientation of the liquid crystal layer in the initial state (i.e., no voltage is applied). In the splay orientation of the initial state, the portion that includes the liquid crystal molecules having the molecular axis parallel to the substrate planes is in the central portion of the liquid crystal layer, as described above.

When a voltage V1 of not less than a threshold voltage is applied to the liquid crystal layer, the liquid crystal molecules in the central portion of the liquid crystal layer tilt, as shown in FIG. 22B. This increases the tilt angle of the liquid crystal molecules in the vicinity of one substrate and decreases the tilt angle of the liquid crystal molecules in the vicinity of the other substrate. Therefore, the position of the portion that includes the liquid crystal molecules having the molecular axis parallel to the substrate planes shifts to the substrate side where the tilt angle is reduced.

Further application of a voltage makes the increase in tilt angle on one substrate side even larger and the decrease in tilt angle on the other substrate side even smaller, as shown in FIGS. 22C and 22D. Therefore, the position of the portion that includes the liquid crystal molecules having the molecular axis parallel to the substrate planes shifts near the substrate where the tilt angle is reduced.

Still further application of a voltage causes a transition to the bend orientation. FIG. 22E shows the orientation immediately before the bend transition and FIG. 22F shows the orientation immediately after the bend transition. The liquid crystal molecules parallel to the substrates are present in FIG. 22E, and not in FIG. 22F. Such a transition from the state of energy concentration (FIG. 22E) to the bend orientation (FIG. 22F) is caused by twisted rotation (slip out) of the liquid crystal molecules in the vicinity of the substrate. After the transition to the bend orientation, the liquid crystal display quickly changes its orientation (FIG. 22F) to the orientation (a normal state) shown in FIG. 22G.

As described above, the splay-bend transition does not occur simultaneously in the entire liquid crystal layer. The bend transition nucleus generated in a specific region of the liquid crystal layer grows gradually while eroding other regions in the up-splay or down-splay state, and finally the entire liquid crystal layer has the bend orientation.

The present inventors also found out that the liquid crystal orientation is relatively unstable before reaching the up-splay or down-splay state, and the bend transition nucleus generated in this state allows the bend orientation to grow rapidly.

Thus, the present invention takes two approaches to improve a splay-bend transition speed: (a) producing an unstable state before the up-splay or down-splay state intentionally; and (b) increasing the transition speed (V2) from the splay orientation to the bend orientation through the up-splay or down-splay state.

Embodiment 1-1

Figure 1:
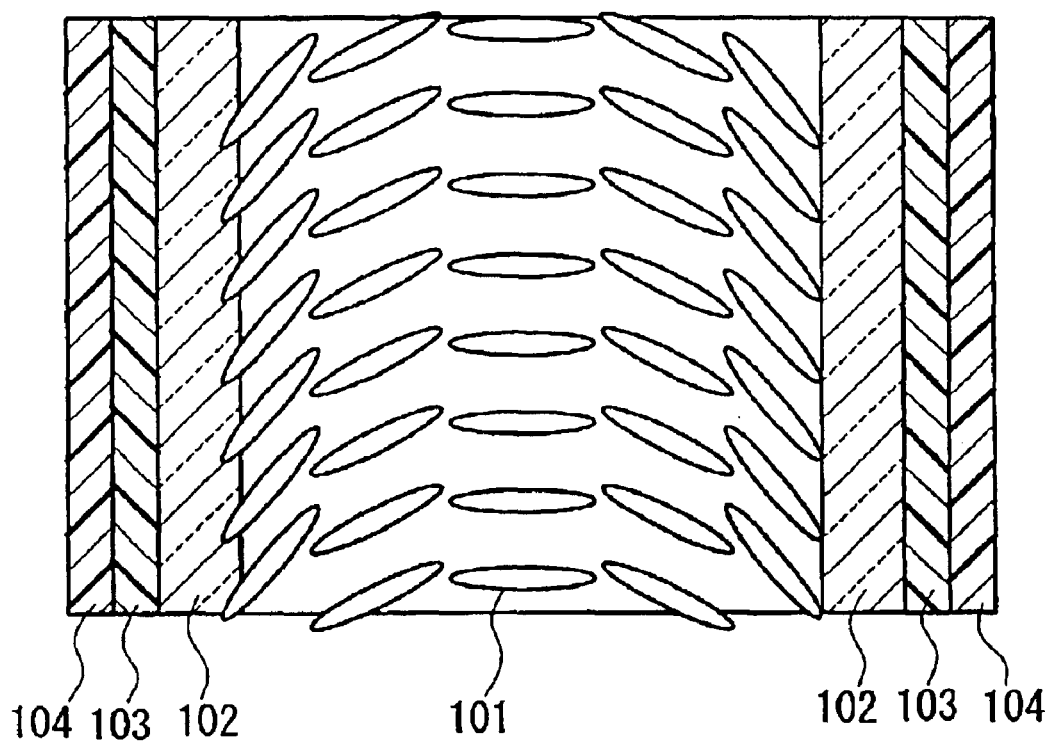
FIG. 1 is a cross-sectional view showing an example of a liquid crystal display of Embodiment 1-1.

FIG. 1 is a cross-sectional view showing an example of the configuration of a liquid crystal display according to the first embodiment of the present invention. In this liquid crystal display, two substrates 102 are opposed to each other via a spacer, and a liquid crystal layer 101 is sandwiched between the substrates 102. Transparent electrodes (not shown) and alignment films (not shown) are formed on the respective surfaces of the substrates 102 on the side of the liquid crystal layer 101. Polarizing plates 104 and phase compensation plates 103 are arranged appropriately on the respective surfaces of the substrates 102 opposite to the liquid crystal layer 101. The liquid crystal display further includes a voltage application means for applying a voltage to the liquid crystal layer via the transparent electrodes In the liquid crystal display of this embodiment, when the liquid crystal layer is in the initial state (i.e., no voltage is applied), it has a splay orientation. The orientation of the liquid crystal layer can be changed into a bend orientation by applying a voltage of not less than a threshold voltage to the liquid crystal layer. FIG. 1 schematically shows the orientation of liquid crystal molecules when the liquid crystal layer has the bend orientation.

The liquid crystal display of this embodiment is adjusted so that a region in the up-splay state and a region in the down-splay state are present in substantially equal proportions when a voltage of less than the threshold voltage is applied to the liquid crystal layer. Specifically, the area ratio (U:D) of the up-splay region (U) to the down-splay region (D) is, e.g., 40:60 to 60:40, and preferably 45:55 to 55:45 when a voltage of less than the threshold voltage is applied to the liquid crystal layer.

The area ratio can be measured in the following manner. The up-splay region and the down-splay region are generated by applying a voltage of about 1 V without causing the bend transition. When observed from the direction that is inclined particularly toward the rubbing direction from the front, the two regions look different in color and brightness, so that it is easy to distinguish between them. Then, areas of the up-splay region and the down-splay region are calculated to determine the area ratio.

It is preferable that each pixel includes the up-splay and down-splay regions. When microscopic observation shows a disclination line generated in a pixel at the same applied voltage as described above, the pixel has both up-splay and down-splay states. Moreover, it is preferable that the area ratio of the up-splay region to the down-splay region in each pixel falls in the above range.

To obtain these characteristics, it is desirable that the absolute values of the pretilt angles at two substrates are equal as much as possible, i.e., the pretilt angles are well symmetric in the liquid crystal display of this embodiment. With an improvement in symmetry of the pretilt angles, a quick and reliable bend transition can be achieved by applying a low voltage. Specifically, a difference in absolute value between the pretilt angle of the liquid crystal molecules in the vicinity of one substrate and the pretilt angle of the liquid crystal molecules in the vicinity of the other substrate is preferably not more than 0.7 degrees, and more preferably not more than 0.5 degrees. When the difference between the pretilt angles is within this range, a quick and reliable bend transition can be achieved by applying a relatively low voltage (e.g., 2.5 V or less). The lower limit of the difference in absolute value between the pretilt angles is not less than 0 degrees.

Here, the pretilt angle (θ) is expressed by $-90° \leq \theta \leq 90°$, using the molecular axis of a liquid crystal molecule parallel to the substrate planes (θ=0°) as reference. This is applied to the following embodiments.

In the liquid crystal display of this embodiment, it is preferable that a variation in pretilt angle within the same substrate is small for each of the two substrates. A smaller variation in pretilt angle makes it easy to improve the symmetry of the pretilt angles at both substrates. For example, the variation in pretilt angle within the same substrate is 0 to 0.7 degrees, and preferably 0 to 0.5 degrees.

In the liquid crystal display of this embodiment, the absolute value of the pretilt angle of the liquid crystal molecules in the vicinity of each substrate is set to be relatively small. A smaller absolute value of the pretilt angle can reduce the variation in pretilt angle, which in turn makes it easy to improve the symmetry of the pretilt angles at both substrates. The absolute value of the pretilt angle is, e.g., not more than 4 degrees, preferably not more than 3 degrees, and more preferably not more than 2 degrees. The lower limit of the absolute value is not particularly limited, and preferably not less than 1 degree. This is because the bend transition may not occur easily when the absolute value is less than 1 degree.

In the liquid crystal display of this embodiment, it is preferable that at least one of the substrates is provided with a bend transition nucleus induction means. As the bend transition nucleus induction means, e.g., a convex structure, a concave structure, a nonlinear element, a means for applying a transverse electric field, and an alignment film containing asymmetric carbon atoms can be used. This bend transition nucleus induction means will be described in detail in the following embodiments 1-2 to 1-4.

Figure 2:
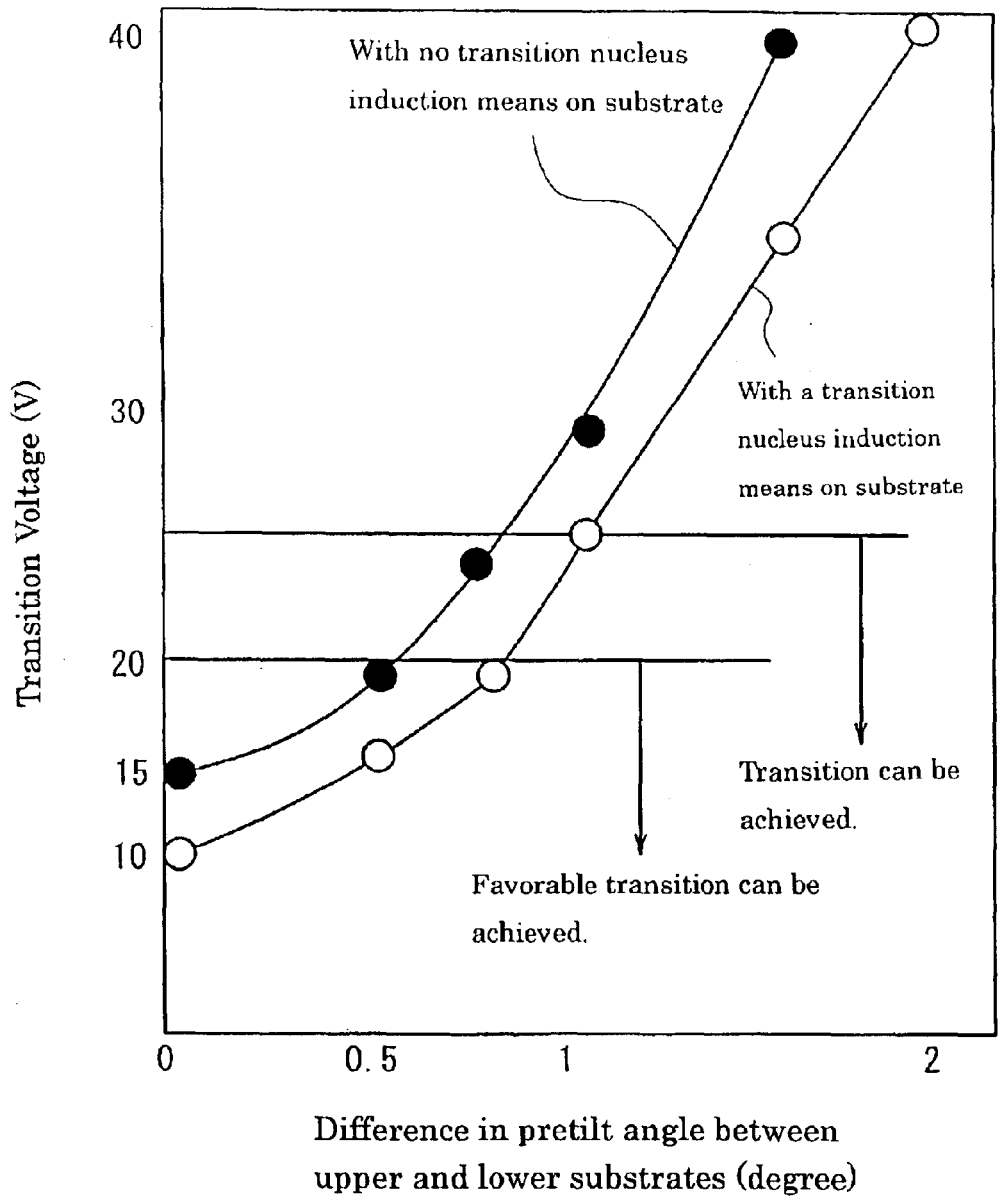
FIG. 2 shows the relationship between asymmetry of pretilt angles at two substrates and a voltage required for transition in a liquid crystal display of Embodiment 1-1.

As shown in FIG. 2, the bend transition nucleus induction means enables a quick and reliable bend transition by applying a relatively low voltage, even if a difference in absolute value between the pretilt angles of the liquid crystal molecules in the vicinity of one substrate and in the vicinity of the other substrate is rather large. Therefore, with the bend transition nucleus induction means, the difference in absolute value between the pretilt angles may be adjusted preferably to not more than 1 degree, and more preferably to not more than 0.8 degree.

Even if the difference in absolute value between the pretilt angles is not more than 2 degrees, a favorable transition also can be achieved in such a manner that the pretilt angle at a predetermined substrate is made asymmetrical intentionally and a transition nucleus is generated on the predetermined substrate side.

To improve the symmetry of the pretilt angles in the liquid crystal display of this embodiment, the following methods can be used.

A first method selects the type of alignment films that are formed on the surfaces of the substrates to be in contact with the liquid crystal layer, thereby reducing a variation in pretilt angle. As described above, the variation can be reduced with decreasing pretilt angle. Therefore, it is preferable to use a material for the alignment film that can reduce the absolute value of the pretilt angle of the liquid crystal molecules at the interface with the alignment film as much as possible. The preferred range of this pretilt angle is as described above.

When a polyimide alignment film is used, the pretilt angle can be reduced, e.g., by decreasing the length of a side chain that extends from a main chain of polyimide, lowering the density of the side chain, decreasing the imidization ratio of the polyimide, and increasing film hardness. For the length of the side chain, it is desirable that the total carbon number in the side chain is not more than 10. For the side chain density, it is desirable that the ratio (P1/P2) of polyimide (P1) having a side chain to polyimide (P2) having no side chain in a polyimide material of the alignment film is not more than ⅓. It is desirable that the imidization ratio is not more than 90%, and that the film hardness is not less than H when measured as pencil hardness.

The use of a material that can reduce a variation in pretilt angle with respect to a change in the conditions of formation of the alignment film also is effective. For example, in the process of forming a polyimide alignment film, a polyimide precursor is fired. It is preferable that the variation in pretilt angle is not more than 0.5 degrees when the firing temperature is changed by 20%. Similarly, it is preferable that the variation in pretilt angle is not more than 0.5 degrees when the firing time is changed by 20%.

Examples of the polyimide alignment film with the above properties include "SE7992" manufactured by Nissan Chemical Industries, Ltd. and "JALS1051" manufactured by Japan Synthetic Rubber Co., Ltd.

A second method adjusts the conditions of formation of alignment films that are formed on the surfaces of the substrates to be in contact with the liquid crystal layer, thereby reducing a variation in pretilt angle. When a polyimide alignment film is used, the variation can be reduced with increasing temperature at which the polyimide alignment film precursor is fired. Similarly, the variation can be reduced with increasing firing time.

A third method performs a rubbing process on the surfaces of the substrates to be in contact with the liquid crystal layer or on the surfaces of alignment films if they are formed and adjusts the rubbing conditions, thereby reducing a variation in pretilt angle. The pretilt angle can be reduced with increasing strength of the rubbing process, which leads to a reduced variation in pretilt angle.

The rubbing process is performed generally as follows: a roller wound with a rubbing cloth is rotated close to the substrate that moves in a fixed direction, thereby rubbing the surface of the substrate (or alignment film) in the fixed direction with the pile of the rubbing cloth. In this case, the strength of the rubbing process can be evaluated, e.g., with a rubbing density [mm$^2$]. The rubbing density R [mm$^2$] is expressed by $$R = 1 \times v \times t$$
$$= 2(z \times r)^{1/2} \cdot 2\pi r \times p/60 \cdot 2(z \times r)^{1/2}/s$$
$$= 0.42 z r^2 p/s$$

where l is a contact distance [mm], v is a linear velocity [mm/s], t is a processing time [s], z is the amount of indentation [mm], r is a roller radius [mm], π is pi, p is the number of revolutions of the roller [rpm], and s is a traveling speed of the substrate [mm/s]. The contact distance is defined by a length of the end portion of the pile that is in contact with the substrate. The linear velocity is defined by a speed at which the end of the pile moves on the substrate. The amount of indentation is defined by a difference between the length of the pile and the distance from the root of the pile to the substrate.

In this method, it is preferable that the rubbing density is not less than 20000 mm$^2$ to achieve the favorable symmetry of the pretilt angles. This range can provide good bend transition characteristics. The upper limit of the rubbing density is not particularly limited and, e.g., not more than 40000 mm$^2$. The preferred range of the rubbing density is 20000 to 35000 mm$^2$.

It is preferable that the rubbing density is adjusted by adjusting the amount of indentation in the rubbing process. For example, when the number of revolutions of the roller is 600 rpm, the traveling speed of the substrate is 20 mm/s, and the roller radius is 75 mm, the amount of indentation is preferably not less than 0.3 mm, and more preferably not less than 0.5 mm. The upper limit of the amount of indentation is not particularly limited and, e.g., may be not more than 0.9 mm. When the indentation amount is more than this value, other flaws may be caused easily. FIG. 3 is a graph showing an example of the relationship between the amount of indentation and the pretilt angle when the rubbing process is performed under the above conditions.

Figure 24A:
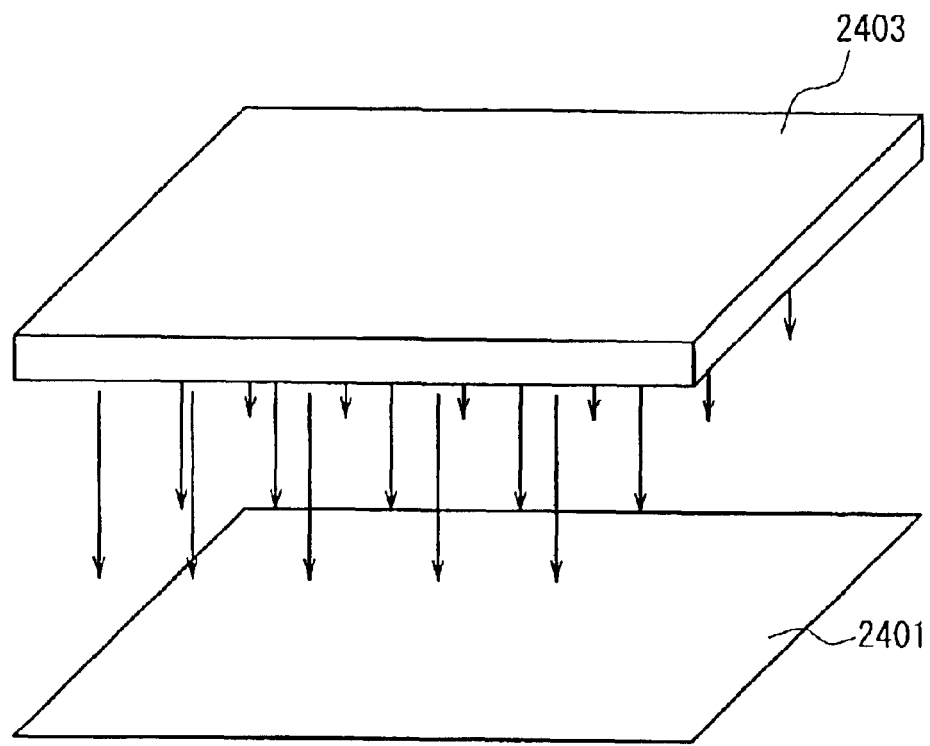
FIG. 24 is a conceptual diagram illustrating the operation of an ionization blower.
Figure 24B:
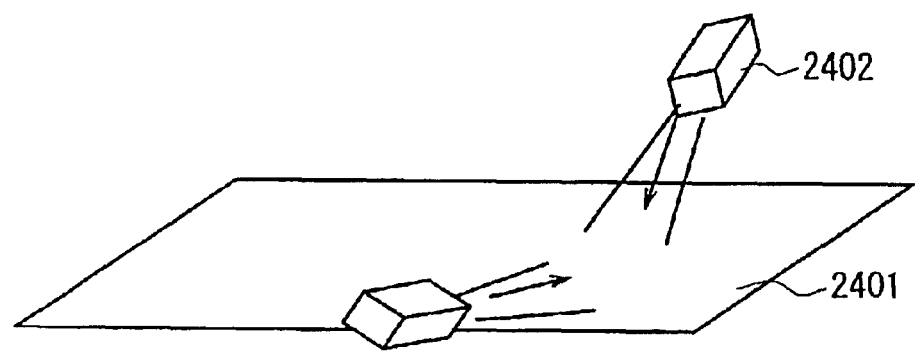

There is a factor that causes a variation in pretilt angle during the manufacturing process. The manufacturing process of a liquid crystal panel that uses an active matrix substrate generally includes an ionization blower (antistatic gun) to prevent the electrostatic discharge damage of a TFT element due to electrification. The ionization blower eliminates the charge on the substrate by spraying ionized air. As shown in FIG. 24B, when a substrate 2401 is irradiated locally with an ionization blower 2402, the pretilt is reduced locally in this irradiated portion. However, such a reduction in pretilt rarely occurs in the same portion of two substrates to be used in combination. Therefore, this pretilt variation causes pretilt asymmetry.

To prevent the pretilt variation, the entire surface of the substrate should be irradiated with the ionization blower, instead of the local irradiation. FIG. 24A is a conceptual diagram illustrating this configuration. As shown in FIG. 24A, a substrate 2401 is irradiated uniformly from above with an ionization blower 2403 having a plurality of spray nozzles, thereby achieving a uniform pretilt variation. The ionization blower is required most when the substrate is lifted up from a stage. At this time, the substrate is irradiated from above with the ionization blower.

As described above, the liquid crystal display of this embodiment can improve the symmetry of the pretilt angles, thereby making the ratio of the up-splay state to the down-splay state substantially equal when a voltage of less than the threshold voltage is applied to the liquid crystal display. Thus, in the process of transition from the splay orientation to the bend orientation by applying a voltage of not less than the threshold voltage, this liquid crystal display can have a relatively longer time of transition from the voltage application to the up-splay or down-splay state, e.g., about 0.5 second. When the transition time to the up-splay or down-splay state is long, the liquid crystal orientation is unstable for a long time before reaching the up-splay or down-splay state. The bend transition nucleus generated in this state allows the bend orientation to grow rapidly, so that a quick and reliable transition to the bend orientation can be performed.

To provide the liquid crystal display as described above, the following inspection may be carried out in the manufacturing process. After a liquid crystal display is produced, a voltage of less than the threshold voltage is applied to the liquid crystal layer, and then an area ratio of the up-splay region to the down-splay region in the liquid crystal layer is evaluated. When the resultant area ratio is equal substantially, i.e., preferably 40:60 to 60:40, and more preferably 45:55 to 55:45, the liquid crystal display is recognized as an acceptable product. This inspection process can be performed by applying, e.g., about 1 V to the liquid crystal layer and observing its display surface from the direction that is inclined particularly toward the rubbing direction from the front. In this case, the two regions look different in color and brightness, so that it is easy to distinguish between them.

Embodiment 1-2

FIG. 4 is a cross-sectional view showing an example of the configuration of a liquid crystal display of this embodiment. In this liquid crystal display, a first substrate 208 and a second substrate 201 are opposed to each other via a spacer 205, and a liquid crystal layer 204 is sandwiched between the substrates. Transparent electrodes 207, 202 are formed on the respective surfaces of the first and second substrates 208, 201 on the side of the liquid crystal layer 204. A first alignment film 206 and a second alignment film 203 are formed on the respective surfaces of the first and second substrates 208, 201 to be in contact with the liquid crystal layer 204. Polarizing plates (not shown) and phase compensation plates (not shown) are arranged appropriately on the respective surfaces of the first and second substrates 208, 201 opposite to the liquid crystal layer 204.

Figure 16:
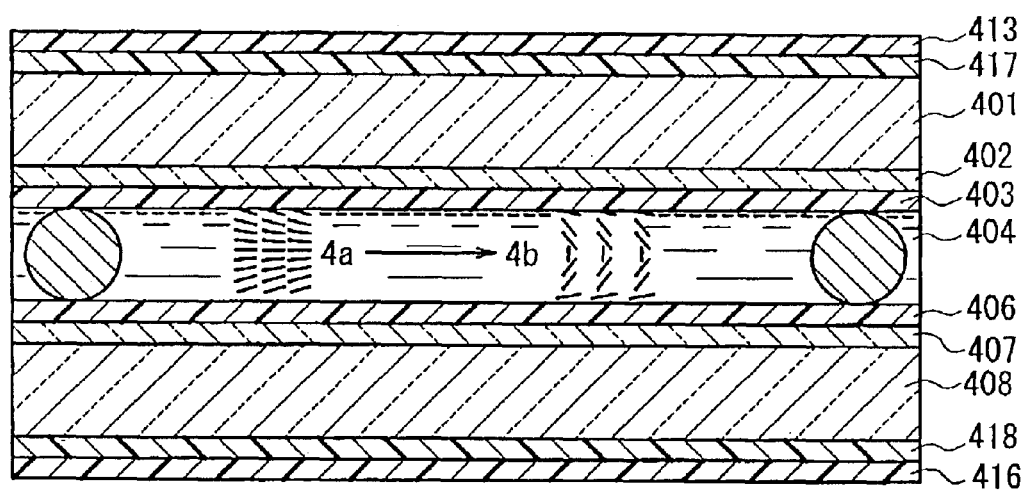
FIG. 16 is a cross-sectional view showing an example of the configuration of an OCB-type liquid crystal display.

When the liquid crystal layer 204 is in the initial state (i.e., no voltage is applied), the molecular axis of the liquid crystal molecules orients substantially parallel to the substrate planes, though it slightly tilts. In other words, the liquid crystal layer 204 has a splay orientation. This orientation is the same as that shown in FIG. 16, represented by 4a. To achieve the splay orientation, the pretilt angle of the liquid crystal molecules in the vicinity of each substrate is controlled, e.g., in the range of 1° to 20°, preferably in the range of 8° to 15°, and more preferably in the range of 10° to 12°. In particular, a relatively large pretilt angle has the merit of reducing a drive voltage.

In the liquid crystal display of the present invention, the absolute value of the pretilt angle of the liquid crystal molecules in the vicinity of the first substrate 208 differs from the absolute value of the pretilt angle of the liquid crystal molecules in the vicinity of the second substrate 201. A difference in absolute value between the pretilt angles is, e.g., 0.5° to 3°, preferably 0.5° to 2.5°, and more preferably 0.5° to 2°. This embodiment gives an example when the absolute value of the pretilt angle of the liquid crystal molecules in the vicinity of the first substrate 208 is smaller than that of the liquid crystal molecules in the vicinity of the second substrate 201.

To make a difference in absolute value of the pretilt angles, the following methods can be used. It is also possible to employ a method according to a second embodiment of the present invention, which will be described later.

In a first method, the first and second alignment films 206, 203 are formed with different materials. Examples of the first and second alignment films 206, 203 include a polyimide alignment film, a monomolecular optical alignment film, and an obliquely evaporated film.

In a second method, the first and second alignment films 206, 203 are formed with the same material or different materials, and the conditions of formation of the first alignment film 206 differ from those of the second alignment film 203, thereby resulting in a difference in the pretilt angles. This method also can use the same materials for the first and second alignment films 206, 203 as those in the first method. For example, when the polyimide alignment film is used, it is formed generally by firing an alignment film material on the substrate. The absolute value of the pretilt angle can be reduced with increasing firing temperature.

In a third method, the first and second alignment films 206, 203 are formed with the same material or different materials, and the type and conditions of an alignment process on the first alignment film 206 differ from those of the second alignment film 203. This method also can use the same materials for the first and second alignment films 206, 203 as those in the first method. Examples of the alignment process include rubbing and ultraviolet irradiation. When the polyimide alignment film is rubbed, the pretilt angle can be reduced with increasing rubbing strength. When the polyimide alignment film is irradiated with ultraviolet rays, the pretilt angle can be reduced with increasing intensity and time of the irradiation. It should be noted that the pretilt angles can be made different by performing the alignment process on either the first alignment film 206 or the second alignment film 203.

When oblique evaporation is used, the pretilt angles can be made different by changing the inclination of the evaporation direction with respect to the substrate plane.

In the liquid crystal display of this embodiment, at least one of the first substrate 208 and the second substrate 201 is provided with a convex structure 210. It is preferable that the convex structure 210 is formed on the substrate at which the pretilt angle of the liquid crystal molecules is smaller than that of the liquid crystal molecules at the other substrate, i.e., the first substrate 208.

The orientation of the liquid crystal molecules is different in the region close to the convex structure 210 from that in the other liquid crystal region. Therefore, the liquid crystal layer has a slightly twisted orientation in the region close to the convex structure 210. This portion of twisted orientation makes it possible to stimulate a quick splay-bend transition by applying a voltage and generating a bend transition nucleus. In other words, the convex structure functions as a bend nucleus induction means for inducing the generation of the bend transition nucleus.

Figure 8:
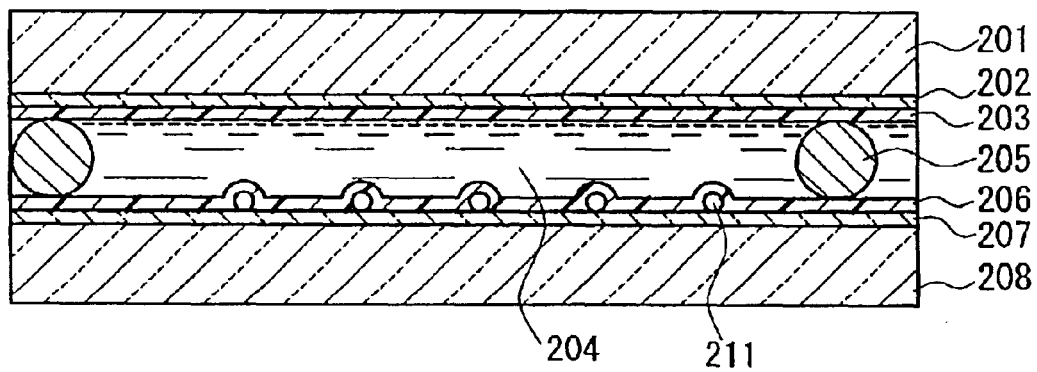
FIG. 8 is a cross-sectional view showing another example of a liquid crystal display of Embodiment 1-2.

There is no particular limitation to the shape of the convex structure 210. For example, a columnar structure such as a cylinder, elliptic cylinder, triangular prism, and quadrangular prism and a cone-shaped structure such as a circular cone, triangular pyramid, and quadrangular pyramid can be used, as shown in FIG. 1. A spherical structure can be used, as shown in FIG. 8.

There is no particular limitation to the position of the convex structure 210, as long as the surface of the substrate to be in contact with the liquid layer can have a convexity. However, when the alignment film is formed on the substrate, the convex structure is located below this alignment film. The convex structure 210 may be formed, e.g., between the substrate 208 and the electrode 207 and also between the electrode 207 and the alignment film 206.

There is no particular limitation to the size of the convex structure 210. For example, the size can be adjusted so that the ratio (h/T) of a height (h) of the convex structure 210 to a thickness (T) of the liquid crystal layer 204 is 0.3 to 1.0, and preferably 0.8 to 1.0. Specifically, h is, e.g., 2.5 to 5 $\mu$m, and preferably 4 to 5 $\mu$m.

The number of the convex structure 210 is not particularly limited, and preferably is at least one per pixel, more preferably 1 to 100 per pixel.

The material for the convex structure 210 is not particularly limited, and various insulating materials can be used. Examples of the insulating materials include an acrylic photoresist. The photoresist has the merit of simplifying an etching process.

There is no particular limitation to a method for forming the convex structure 210. For example, when a photoresist is used to form the convex structure 210, the photoresist may be deposited on the substrate and then patterned into a desired shape by photolithography. When the convex structure 210 is not formed with the photoresist, the following method can be employed. A material for forming the convex structure 210 is deposited on the substrate, a photoresist is applied to the material, and the photoresist is patterned into a desired shape by photolithography. Then, the material for forming the convex structure is etched using the pattern as a mask. When a spherical structure is used as the convex structure 210, it is also possible to disperse particles having a desired shape in an appropriate resin and apply the resin to the substrate.

A concave structure can be used instead of the convex structure. There is no particular limitation to the shape of the concave structure. For example, a columnar concavity such as a cylinder, elliptic cylinder, triangular prism, and quadrangular prism and a cone-shaped concavity such as a circular cone, triangular pyramid, and quadrangular pyramid can be used.

There is no particular limitation to the size of the concave structure. For example, the depth of the concavity of the concave structure may be set in the same manner as the height of the convexity of the convex structure. The position, number, and material for forming the concave structure are the same as those of the convex structure.

The concave structure may be formed, e.g., by a method using photolithography, as is described in the concave structure.

In the liquid crystal display of this embodiment, the pretilt angle of the liquid crystal molecules at the first substrate differs from that of the liquid crystal molecules at the second substrate. Therefore, the shift of a portion that includes the liquid crystal molecules having the molecular axis parallel to the substrates is restricted in one direction, specifically in the direction of the substrate at which the pretilt angle is smaller (i.e., the first substrate). Thus, one of the up-splay state and the down-splay state can be generated selectively. Consequently, it is estimated that a transition time from the splay orientation to the up-splay or down-splay state can be reduced, which in turn reduces the bend transition time.

The liquid crystal display of this embodiment is provided with the bend transition nucleus induction means, which can assist slip out. Thus, it is estimated that a transition time from the up-splay or down-splay state to the bend orientation can be reduced, which in turn reduces the bend transition time.

Embodiment 1-3

FIG. 9 is a cross-sectional view showing an example of the configuration of a liquid crystal display of this embodiment. In FIG. 9, the identical elements to those in FIG. 4 are denoted by the same reference numerals, and the detailed explanation will be omitted. Though a polarizing plate, a phase compensation plate, and the like are not illustrated in FIG. 9, this embodiment is not limited thereto.

In this embodiment, like the first embodiment, when a liquid crystal layer is in the initial state (i.e., no voltage is applied), it has a splay orientation. Moreover, the absolute value of the pretilt angle of the liquid crystal molecules in the vicinity of a first substrate 208 differs from the absolute value of the pretilt angle of the liquid crystal molecules in the vicinity of a second substrate 201. The absolute value, difference, and adjusting method of the pretilt angles can be the same as those in the first embodiment.

In this embodiment, one of the first and second substrates 208, 201, preferably the first substrate 208, is formed as an active matrix substrate. Specifically, a pixel electrode 214 and a nonlinear element 212 that is connected electrically to the pixel electrode 214 are formed on the first substrate. As the nonlinear element 212, e.g., a thin film transistor (TFT) can be used. Moreover, a gate line (not shown) for operating the nonlinear element 212 and a source line 213 for supplying an electric signal to the pixel electrode are formed on the first substrate. FIG. 10 is a plan view showing an example of the arrangement of the pixel electrode 214, the nonlinear element 212, the gate line 215, and the source line 213 in the active matrix substrate.

In this embodiment, a convexity is formed on the surface of the first substrate 208 due to the presence of the nonlinear element 212. This convexity functions as a bend transition nucleus induction means, like the convex structure in Embodiment 1-2. The height (h) of the convexity formed on the surface of the active matrix substrate can be adjusted so that the ratio (h/T) of the height (h) to a thickness (T) of the liquid crystal layer 204 is, e.g., 0.02 to 0.2, and preferably 0.1 to 0.2. Specifically, h is, e.g., 0.1 to 1 $\mu$m, and preferably 0.5 to 1 $\mu$m.

By applying a voltage to the pixel electrode 214 and the source line 213, a transverse electric field can be generated therebetween. The application of the transverse electric field to the liquid crystal layer imparts a twist effect to the liquid crystal molecules, so that a bend transition nucleus can be formed in this portion. In other words, a means for applying a transverse electric field between the pixel electrode and the source line functions as the bend transition nucleus induction means.

Figure 11:
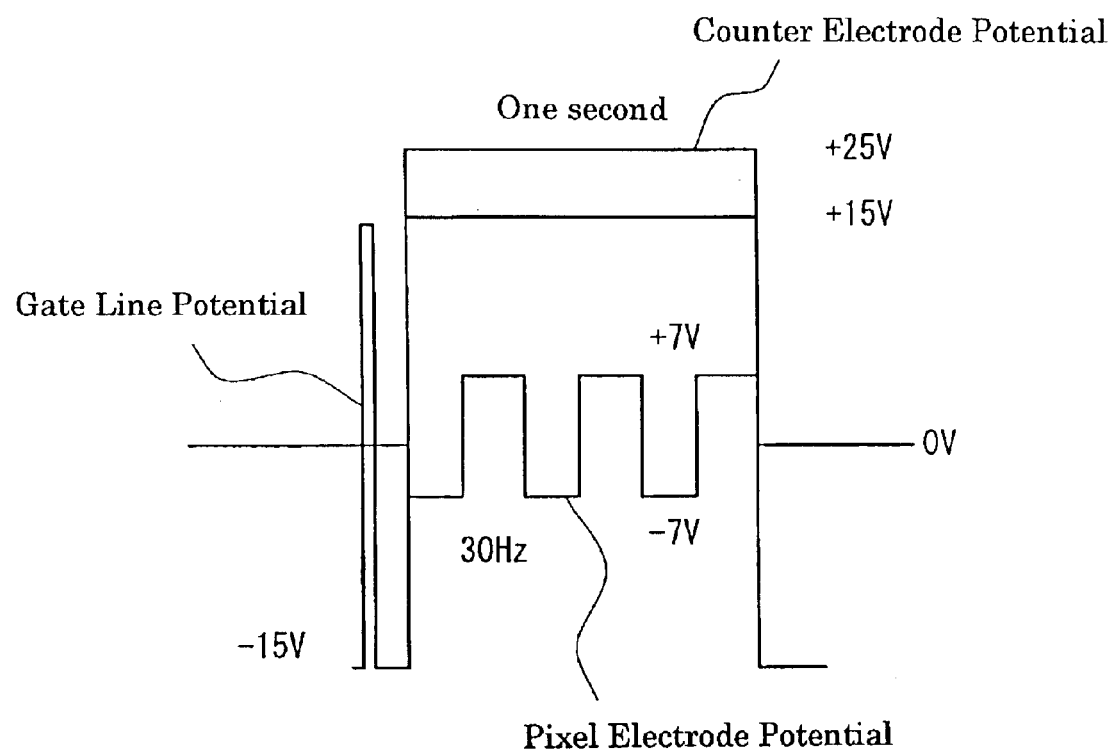
FIG. 11 shows an example of a transition waveform to be applied to a liquid crystal display of Embodiment 1-3.

A voltage having a waveform, e.g., shown in FIG. 11 is applied to a liquid crystal display with the configuration in FIG. 9, thereby causing the bend transition. This transition waveform is described briefly in the following. A DC waveform having a voltage of +25 V is applied to an electrode 202 (counter electrode) formed on the second substrate 201 for one second. An AC rectangular waveform having a voltage of ±7 V, a frequency (field frequency) of 30 Hz, and a duty of 50% is applied to the source line. At this time, a voltage of 7 V is applied to the pixel electrode, and +15 V to the gate line.

Figure 12:
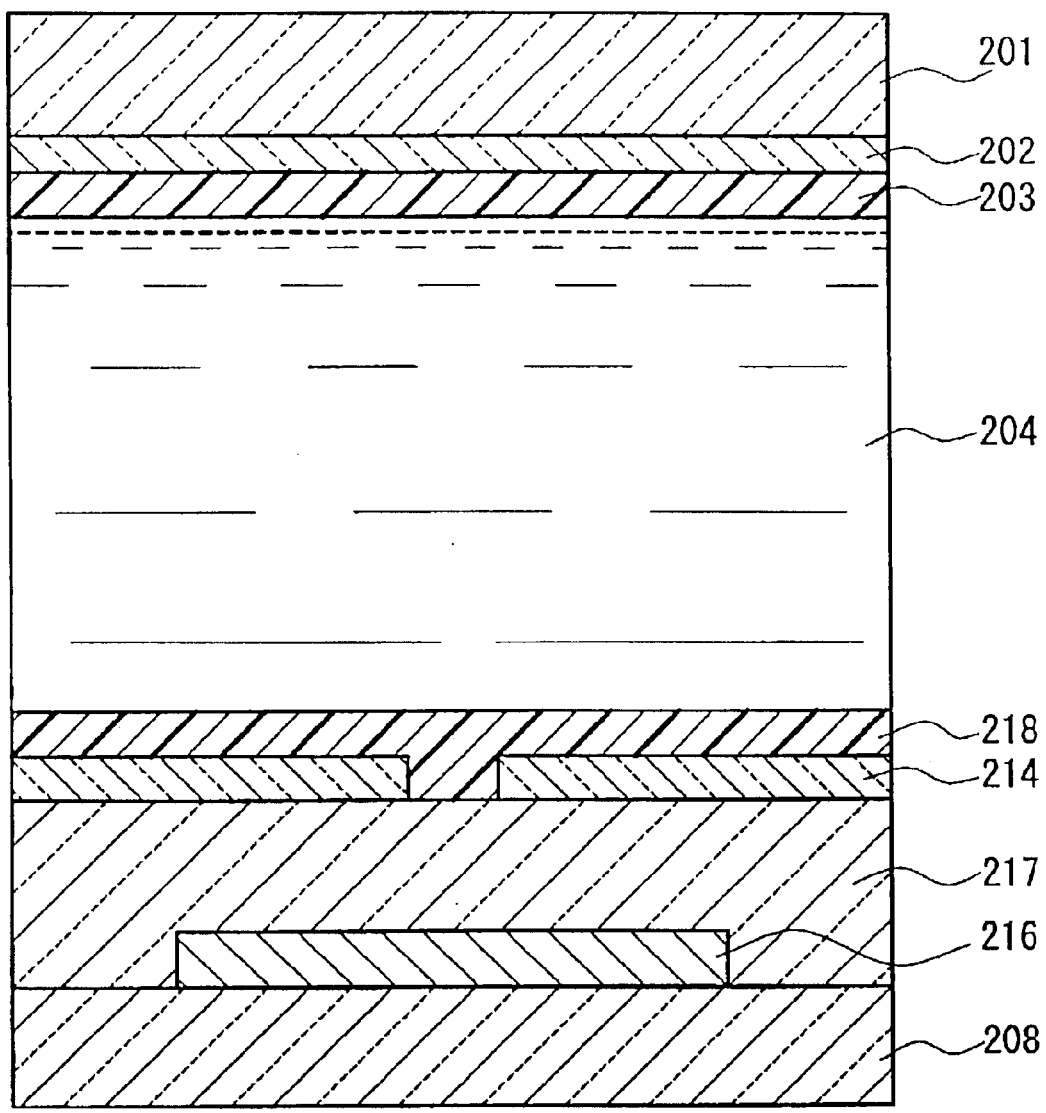
FIG. 12 is a cross-sectional view showing another example of a liquid crystal display of Embodiment 1-3.

The substrate provided with the transverse electric field application means also can have the configuration as shown in FIG. 12. In this example, a capacitance electrode 216 is formed on a first substrate 208, and an insulating film 217 is formed so as to cover the capacitance electrode 216. A pixel electrode 214 is formed on the insulating film 217 so as to overlap with the capacitance electrode 216. The pixel electrode 214 has a slit 218 in the overlap portion. In this liquid crystal display, like FIGS. 9 and 10, a nonlinear element that is connected to the pixel electrode 214, a gate line, and a source line are formed on the substrate 208. When the above configuration is employed, a transverse electric field is generated in a portion of the slit 218 to cause a plurality of twisted orientations, thus forming a bend transition nucleus.

Figure 13:
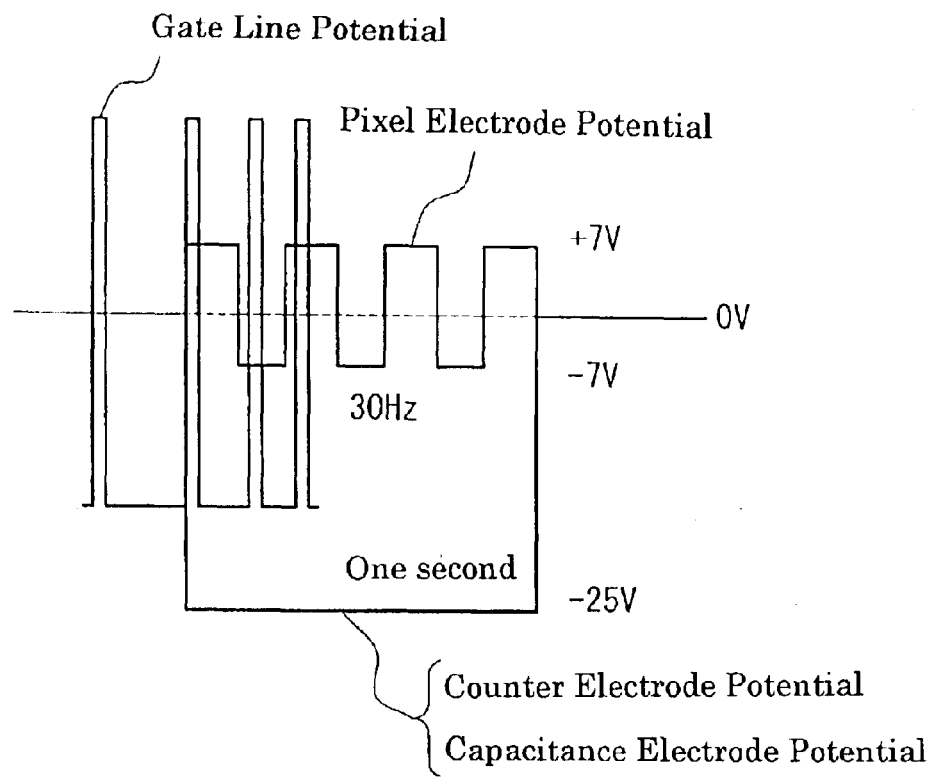
FIG. 13 shows another example of a transition waveform to be applied to a liquid crystal display of Embodiment 1-3.

A voltage having a waveform, e.g., shown in FIG. 13 is applied to a liquid crystal display with the configuration in FIG. 12, thereby causing the bend transition. This transition waveform is described briefly in the following. A DC waveform having a voltage of −25 V is applied to an electrode 202 (counter electrode) formed on a second substrate 201 for one second. An AC rectangular waveform having a voltage of ±7 V, a frequency (field frequency) of 30 Hz, and a duty of 50% is applied to the source line. At this time, a voltage of 7 V is applied to the pixel electrode, and +15 V to the gate line. Moreover, the same voltage as that of the counter electrode is applied to the capacitance electrode. The capacitance electrode and the counter electrode may be short-circuited structurally. It is desirable that an electric field is not applied to the liquid crystal layer, i.e., between the pixel electrode and the counter electrode, immediately before applying the transition waveform. To achieve this, both the counter electrode and the source line should be 0 V.

In the liquid crystal display of this embodiment, like the first embodiment, a difference between the pretilt angles makes it possible to shift a portion that includes the liquid crystal molecules whose orientation is parallel to the substrates quickly to one of the substrate sides. Further, the convexity formed by the nonlinear element and the transverse electric field generated between bus lines induce the bend transition nucleus to assist slip out, thus achieving a quick transition to the bend orientation.

Embodiment 1-4

Figure 14:
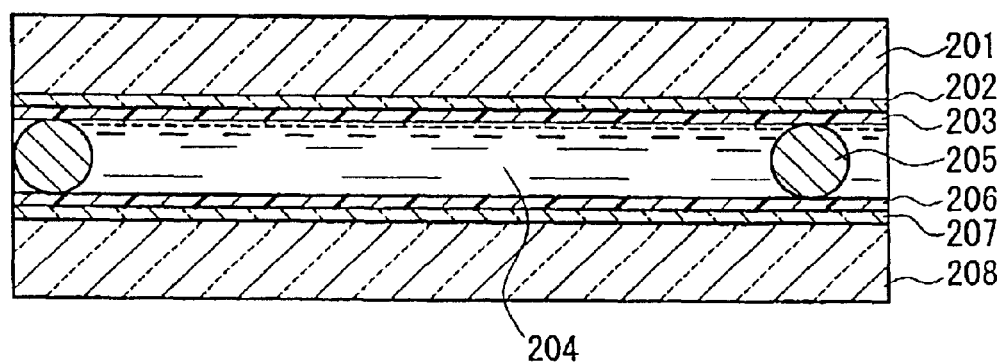
FIG. 14 is a cross-sectional view showing an example of a liquid crystal display of Embodiment 1-4.

FIG. 14 is a cross-sectional view showing an example of the configuration of a liquid crystal display of this embodiment. In FIG. 14, the identical elements to those in FIG. 4 are denoted by the same reference numerals, and the detailed explanation will be omitted. Though a polarizing plate, a phase compensation plate, and the like are not illustrated in FIG. 14, this embodiment is not limited thereto.

In this embodiment, like the first embodiment, when a liquid crystal layer is in the initial state (i.e., no voltage is applied), it has a splay orientation. Moreover, the absolute value of the pretilt angle of the liquid crystal molecules in the vicinity of a first substrate 208 differs from the absolute value of the pretilt angle of the liquid crystal molecules in the vicinity of a second substrate 201. The absolute value, difference, and adjusting method of the pretilt angles can be the same as those in the first embodiment.

In this embodiment, at least one of the first and second substrates 208, 201 is provided with an alignment film containing asymmetric carbon atoms. It is preferable that the alignment film is formed on the substrate at which the pretilt angle of the liquid crystal molecules is smaller than that of the liquid crystal molecules at the other substrate, i.e., the first substrate 208. In other words, a first alignment film 206 preferably is the alignment film containing asymmetric carbon atoms.

The use of the alignment film containing asymmetric carbon atoms imparts a twist effect to the liquid crystal molecules that are present in the vicinity of the asymmetric carbon atoms, so that a bend transition nucleus can be formed in this portion. In other words, this alignment film functions as the bend transition nucleus induction means. The bend orientation spreads from the bend transition nucleus to other regions around the nucleus, and thus a quick transition can be achieved throughout the display region.

As the alignment film, e.g., a high molecular weight compound containing asymmetric carbon atoms can be used. In this case, the asymmetric carbon atoms may be contained in the main chain or side chain of the high molecular weight compound. The alignment film may be a mixture of a low molecular weight compound and the high molecular weight compound that contains asymmetric carbon atoms.

The alignment film is preferably a high molecular weight compound that contains asymmetric carbon atoms in its main chain, and more preferably a polyimide-based compound that contains asymmetric carbon atoms in its main chain. The polyimide-based compound can be expressed, e.g., by the following formula 1 or 2.

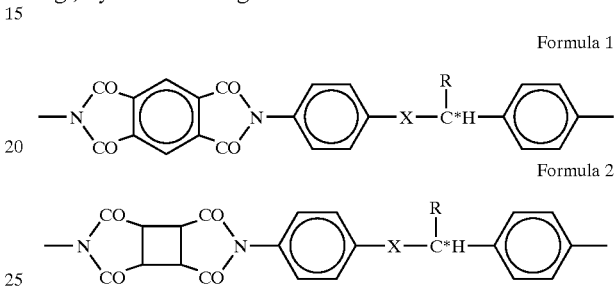

In the formulas 1 and 2, R denotes $CH_nH_{2n+1}$ (n is integers of not less than 1) or the product of substitution with halogen, e.g., $CH_3$, $CHF_2$, and $CF_3$. X denotes the product of substitution with halogen or hydrogen, represented by —COO—, —O—, —C=C—, —CH$_2$—, or —C=C—.

Here, the compound needs to contain the asymmetric carbon, which causes the tendency to generate a twisted orientation of the liquid crystal molecules. This makes the transition easier. When the asymmetric carbon is at the root of the side chain, the whole side chain can have the effect of generating the twisted orientation. Even if the asymmetric carbon is in the middle or at the end of the side chain, the above effect can be obtained in varying degrees. The asymmetric carbon at the root of the side chain provides the largest effect. The longer the side chain is, the more effective it becomes. It is desirable that the total carbon number is not less than 3.

The following compounds are suitable for the alignment films.

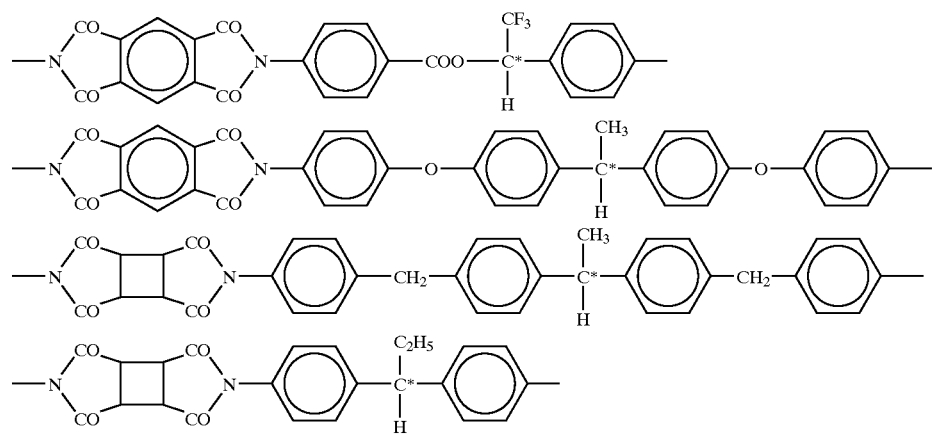

There is no particular limitation to a method for forming the alignment film. For example, when the polyimide-based compound is used, a solution that includes the compound or its precursor may be applied to the substrate and then fired. The conditions of formation are not particularly limited and can be selected, e.g., to achieve a desired pretilt angle. The thickness of the alignment film is not particularly limited as well. For example, the thickness is 30 to 120 nm, and preferably 70 to 100 nm.

The alignment film can be subjected to an alignment process, such as rubbing and ultraviolet irradiation. The type and conditions of the alignment process are not particularly limited and can be selected, e.g., to achieve a desired pretilt angle.

In the liquid crystal display of this embodiment, like the first embodiment, a difference between the pretilt angles makes it possible to shift a portion that includes the liquid crystal molecules whose orientation is parallel to the substrates quickly to one of the substrate sides. Further, the alignment film containing asymmetric carbon atoms functions as the bend transition nucleus induction means and assists slip out, thus achieving a quick transition to the bend orientation.

Embodiment 1-4

A liquid crystal display of this embodiment can improve the bend transition characteristics by making a difference in absolute value between pretilt angles and using a specific material for a liquid crystal layer. Such a liquid crystal display is described below. Since the liquid crystal display has substantially the same configuration as that shown in FIG. 14, the detailed explanation will be omitted. Though a polarizing plate, a phase compensation plate, and the like are not illustrated in FIG. 14, this embodiment is not limited thereto.

In this embodiment, like the first embodiment, when the liquid crystal layer is in the initial state (i.e., no voltage is applied), it has a splay orientation. Moreover, the absolute value of the pretilt angle of the liquid crystal molecules in the vicinity of a first substrate 208 differs from the absolute value of the pretilt angle of the liquid crystal molecules in the vicinity of a second substrate 201. The absolute value, difference, and adjusting method of the pretilt angles can be the same as those in the first embodiment.

In this embodiment, a material having a twist elastic constant $k_{22}$ of not more than 10 pN is used as a liquid crystal material for the liquid crystal layer 204. When the twist elastic constant $k_{22}$ is more than 10 pN, it is difficult to achieve a sufficiently high-speed splay-bend transition. The lower limit of the twist elastic constant $k_{22}$ is not particularly limited, and generally is not less than 1 pN. The twist elastic constant $k_{22}$ is preferably in the range of 3 to 10 pN, and more preferably in the range of 5 to 10 pN.

There is no particular limitation to the type of the liquid crystal material, as long as it has the twist elastic constant $k_{22}$ in the above range. For example, various liquid crystal materials can be used, such as pyrimidine liquid crystals, dioxane liquid crystals, and biphenyl liquid crystals.

In the liquid crystal display of this embodiment, like the first embodiment, a difference between the pretilt angles makes it possible to shift a portion that includes the liquid crystal molecules whose orientation is parallel to the substrates quickly to one of the substrate sides.

Second Embodiment

Embodiment 2-1

A liquid crystal display of this embodiment includes a first substrate, a second substrate, and a liquid crystal layer sandwiched between the substrates. The first and second substrates are opposed to each other. The absolute value of a pretilt angle of the liquid crystal molecules in the vicinity of the first substrate differs from the absolute value of a pretilt angle of the liquid crystal molecules in the vicinity of the second substrate. Examples of such a liquid crystal display include a R-OCB-type liquid crystal display.

Figure 15:
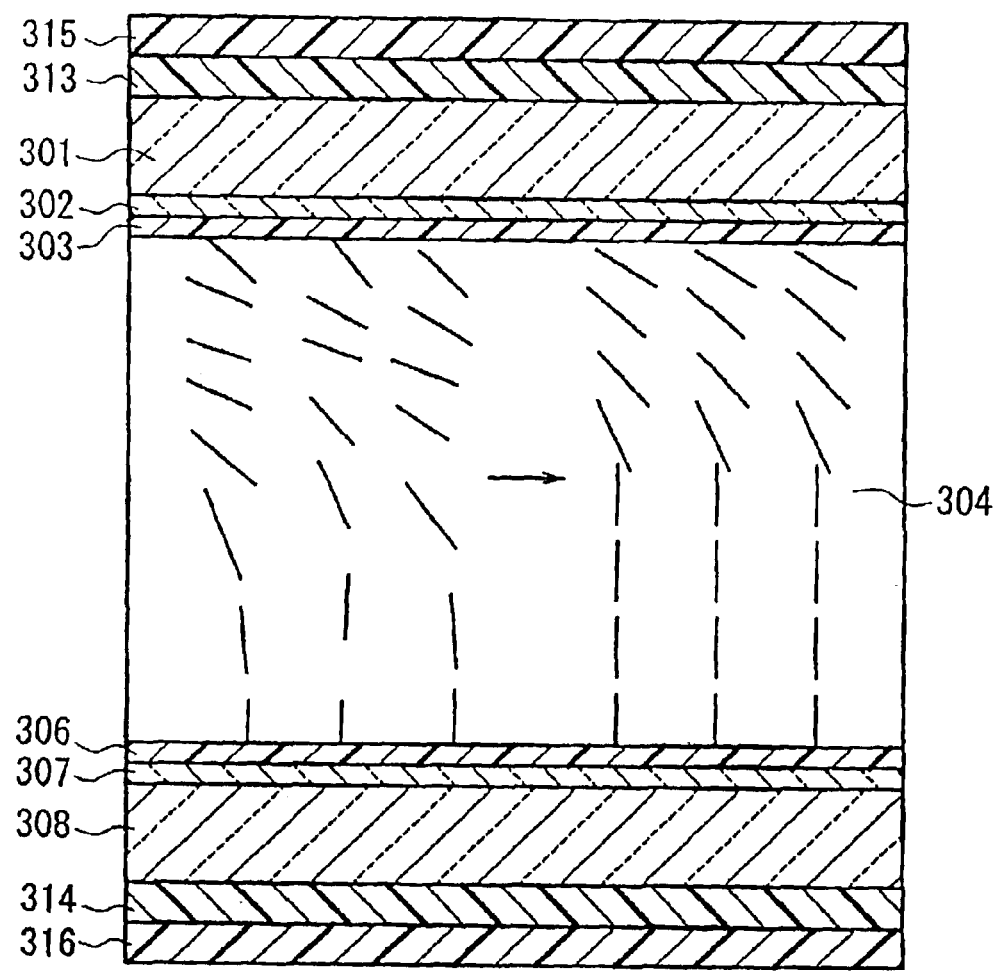
FIG. 15 is a cross-sectional view showing an example of a liquid crystal display of Embodiment 2-1.

FIG. 15 is a cross-sectional view showing an example of the configuration of a liquid crystal display of the second embodiment of the present invention. In this liquid crystal display, a first substrate 301 and a second substrate 308 are opposed to each other via a spacer, and a liquid crystal layer 304 is sandwiched between the substrates. Transparent electrodes 302, 307 are formed on the respective surfaces of the first and second substrates 301, 308 on the side of the liquid crystal layer. A first alignment film 303 and a second alignment film 306 are formed on the respective surfaces of the first and second substrates 301, 308 to be in contact with the liquid crystal layer. Polarizing plates 315, 316 and phase compensation plates 313, 314 are arranged appropriately on the respective surfaces of the first and second substrates 301, 308 opposite to the liquid crystal layer.

In this liquid crystal display, when the liquid crystal layer is in the initial state (i.e., no voltage is applied), the molecular axis of the liquid crystal molecules in the vicinity of the first substrate 301 orients substantially parallel to the substrate plane, though it slightly tilts, while the molecular axis of the liquid crystal molecules in the vicinity of the second substrate 308 orients substantially perpendicular to the substrate plane, though it slightly tilt. In other words, the liquid crystal layer has a hybrid orientation.

To achieve the hybrid orientation, the liquid crystal molecules in the vicinity of the first substrate 301 are controlled so as to orient parallel or substantially parallel to the substrate plane. For example, the pretilt angle of these liquid crystal molecules is, e.g., in the range of 0° to 15°, preferably in the range of 40° to 10°, and more preferable in the range of 6° to 10°. On the other hand, the liquid crystal molecules in the vicinity of the second substrate 308 are controlled so as to perpendicular or substantially perpendicular to the substrate plane. For example, the pretilt angle of these liquid crystal molecules is, e.g., in the range of 30° to 80°, preferably in the range of 40° to 80°, and more preferably in the range of 60° to 80°.

In this embodiment, the first and second alignment films 303, 306 are formed with the same material. To make a difference between the pretilt angle at the first substrate and that at the second substrate by using the alignment films of the same material, the following methods can be used.

First Method

The transparent electrodes 302, 307 are formed on the first and second substrate 301, 308, respectively. As an electrode material, e.g., a transparent conductive material such as an indium tin oxide can be used. The transparent electrodes can be formed in such a manner that, e.g., the electrode material is deposited with chemical vapor deposition (CVD), which then is patterned by photolithography and etching.

The first and second alignment films 303, 306 are formed on the first and second substrates 301, 308 so as to cover the transparent electrodes, respectively. In this case, the first and second alignment films 303, 306 are formed with the same material.

There is no particular limitation to the material for the alignment films. For example, a polyimide alignment film material, a monomolecular optical alignment film, and an obliquely evaporated film can be used. As the monomolecular optical alignment film, e.g., hydrolyzed or dehydrated fluoroalkylsiloxane can be used, which is expressed by the following formula.

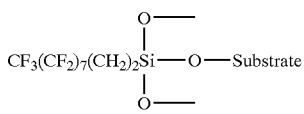

As the obliquely evaporated film, e.g., silicon oxide can be used. The evaporation angle is not particularly limited and is, e.g., 4 to 15 degrees.

Next, only one of the first and second alignment films 303, 307 is subjected to an alignment process. Examples of the alignment process include rubbing, water-repellent treatment, and ultraviolet irradiation. The conditions of the alignment process are set in accordance with a desired pretilt angle while considering controllability of the pretilt angle of the alignment film.

When rubbing is employed, the absolute value of the pretilt angle can be reduced with increasing rubbing strength and rubbing density. The rubbing strength can be expressed, e.g., by the rubbing density. The definition of the rubbing density has been described in the first embodiment.

For a polyimide alignment film, the pretilt is controlled generally by side chains of the alignment film. The pretilt is reduced by aligning the side chains in one direction. Therefore, a vertical orientation can be achieved when the side chains have no directivity and a horizontal orientation can be achieved when they have high directivity after rubbing.

For example, a polyimide-based compound is used for the first and second alignment films 303, 307 to produce a liquid crystal display with the hybrid orientation. In such a case, the rubbing density may be set in the range of 5000 to 30000 mm$^2$, preferably in the range of 10000 to 25000 mm$^2$, and more preferably in the range of 10000 to 20000 mm$^2$.

When ultraviolet irradiation is employed, the absolute value of the pretilt angle can be reduced with increasing intensity of the irradiation. For example, a polyimide-based compound is used for the first and second alignment films 303, 307 to produce a liquid crystal display with the hybrid orientation. In such a case, the irradiation intensity may be set in the range of 10 to 1000 W, preferably in the range of 100 to 1000 W, and more preferably in the range of 200 to 1000 W.

The absolute value of the pretilt angle also can be reduced with increasing time of the irradiation. For example, a polyimide-based compound is used for the first and second alignment films 303, 307 to produce a liquid crystal display with the hybrid orientation. In such a case, the irradiation time may be set in the range of 2 to 200 seconds, preferably in the range of 2 to 20 seconds, and more preferably in the range of 2 to 10 seconds.

When a polyimide-based compound is used for the alignment films to produce a liquid crystal display with the hybrid orientation, the integrated irradiation per unit area may be set in the range of 100 to 1000 mJ/cm$^2$, preferably in the range of 100 to 500 mJ/cm$^2$, and more preferably in the range of 100 to 200 mJ/cm$^2$.

In the water-repellent treatment, e.g., a water-repellent surface-active agent may be applied to the alignment film surface. Examples of the surface-active agent include a fluorine-coating compound, such as fluoroalkylsiloxane represented by $CF_3(CF_2)_7$—$(CH_2)_2 13$ $SiCl_3$. It is particularly preferable to use a compound that contains a small amount of fluorine because the display characteristics can be improved further. A greater effect also can be obtained only by exposing the alignment film in an atmosphere containing a silane coupling agent.

Generally, when the water-repellent treatment is employed, the vertical orientation is achieved with high repellency and the horizontal orientation is achieved with high hydrophilicity. Therefore, one of the pretilts can be increased by the water-repellent treatment on the alignment film surface. In this case, the pretilt angle is substantially the same as a contact angle of the water-repellent surface-active agent. When this value is more than about 40°, the liquid crystal orientation is degraded, making it difficult to achieve a uniform orientation. Thus, this is not effective.

The alignment process may be performed on both first and second alignment films 303, 307, and the processing conditions of the first alignment film 303 may differ from those of the second alignment film 307. The difference in conditions is the same as that described above.

When the monomolecular optical alignment film or the obliquely evaporated film is used, it is possible to apply substantially the same conditions as those of the polyimide alignment film. The oblique evaporation can provide the vertical and horizontal orientations while maintaining the same electric characteristics if the thickness is about the same and the directions of inclination are different. The monomolecular optical alignment film has an extremely small thickness. Therefore, even if there is some degree of electrical asymmetry, it has the merit of reducing the asymmetry.

Second Method

The second method is effective in using a polyimide alignment film as the alignment film. First, like the first method, the transparent electrodes 302, 307 are formed on the first and second substrates 301, 308, respectively.

Then, a polyimide alignment film material is applied to each of the first and second substrates 301, 308 so as to cover the electrodes, thereby forming a first alignment film precursor and a second alignment film precursor. Here, the same polyimide alignment film material is used for the first and second substrates 301, 308.

Next, the first and second alignment film precursors are fired. At this time, the firing conditions such as the firing temperature of the first alignment film precursor differ from those of the second alignment film precursor. The absolute value of the pretilt angle can be reduced with increasing firing temperature. For example, when a liquid crystal display with the hybrid orientation is produced, a difference in firing temperature between the first and second alignment film precursors is preferably 60 to 80° C., and more preferably 80 to 100° C.

Instead of the firing temperature, the firing time may be changed. The absolute value of the pretilt angle can be reduced with increasing firing time. For example, when a liquid crystal display with the hybrid orientation is produced, a difference in firing time between the first and second alignment film precursors is preferably 5 to 20 minutes, and more preferably 5 to 10 minutes. Even if the firing temperature is the same, the thermal hysteresis should be changed, e.g., the alignment film precursors are cooled slowly or rapidly. Alternatively, the first and second alignment films may be fired with a different temperature and time.

In a liquid crystal display with the hybrid orientation of this embodiment, the same alignment film is used for two substrates. Therefore, the asymmetry in electric characteristics of the substrates does not occur easily, so that a favorable display can be achieved while decreasing undesired display.

Embodiment 2-2

The following is an explanation of another example of a liquid crystal display according to the second embodiment of the present invention. Since the liquid crystal display has substantially the same configuration as that shown in FIG. 15, the detailed explanation will be omitted.

Like Embodiment 2-1, the liquid crystal layer of this embodiment has e.g., a hybrid orientation, in which the absolute value of a pretilt angle of liquid crystal molecules in the vicinity of a first substrate differs from the absolute value of a pretilt angle of liquid crystal molecules in the vicinity of a second substrate. The absolute values and difference of the pretilt angles are the same as those in the second embodiment.

In this embodiment, a first alignment film 303 and a second alignment film 306 are formed with different materials and have different thicknesses. Their thicknesses are adjusted so that the first and second alignment films 303, 306 have about the same capacitance. That is, when the dielectric constant of the first alignment film 303 is larger than that of the second alignment film 306, the thickness of the first alignment film 303 is smaller than that of the second alignment film 306.

Favorable characteristics can be obtained when a difference in capacitance between the first and second alignment films is not more than 10% of the capacitance of one alignment film smaller than that of the other, preferably not more than 5%, and more preferably not more than 3%. However, the display characteristics are affected by the correlation between a liquid crystal material and an alignment film material and the specific resistance of the liquid crystal layer. Therefore, the difference in capacitance is not necessarily within the above range.

In this embodiment, the first and second alignment films 303, 306 may be formed with different materials, and an insulating film may be deposited below at least one of the first and second alignment films. In this case, favorable characteristics also can be obtained when a difference in resultant capacitance between the first and second substrates is not more than 10% of the resultant capacitance of one substrate smaller than that of the other, preferably not more than 5%, and more preferably not more than 3%. Here, the resultant capacitance is considered to be equivalent to a capacitor formed by connecting the alignment film and its underlying layer in series. The underlying layer of a material having a low dielectric constant is effective in using the alignment film material having a high dielectric constant. As described above, the display characteristics are affected by the correlation between the liquid crystal material and the alignment film material and the specific resistance of the liquid crystal layer. Therefore, the difference in capacitance is not necessarily within the above range.

The material and thickness of the insulating film are not particularly limited, as long as they satisfy the conditions described above. Examples of the insulating film material include an inorganic material such as $SiO_2$, $SiO_x$, SiN, and $Ta_2O_5$ and an organic material such as acrylic photoresist. The thickness of the insulating film is, e.g., 50 to 5000 nm, and preferably 100 to 4000 nm.

The film deposited below the alignment film is not limited to an insulating film, and an organic polymer film for CF flattening may be used instead.

The material and thickness of the first and second alignment films are not particularly limited, as long as they satisfy the conditions described above. The materials described in Embodiment 2-1 can be used for the alignment films. The thickness of the alignment films is, e.g., 20 to 200 nm, and preferably 50 to 120 nm.

In a liquid crystal display with the hybrid orientation of this embodiment, the thicknesses of alignment films are adjusted and an insulating film is formed further. Therefore, even if different alignment films are used for two substrates, the asymmetry in electric characteristics of the substrates is reduced, so that a favorable display can be achieved while decreasing undesired display.

The liquid crystal display of this embodiment is not particularly limited by a display mode, as long as the there is a difference in pretilt angle between the upper and lower substrates. Thus, it can be applied to liquid crystal displays with various modes, regardless of a reflection or transmission type.

The methods of this embodiment can be applied to not only the alignment films but also any additional films for generating electrical asymmetry in the liquid crystal layer. When the electrical asymmetry is generated in the liquid crystal layer during operation of the liquid crystal display, it is effective that an opposite electrical asymmetry is formed intentionally so as to cancel the operational asymmetry in the upper and lower substrates.

EXAMPLES

Hereinafter, the present invention will be described in more detail by way of examples. However, the present invention is not limited by the examples.

Example 1

A liquid crystal cell having the same configuration as that shown in FIG. 1 was produced in the following manner.

Two glass substrates were prepared, and an indium tin oxide (referred to as "ITO" in the following) film was deposited on each of the glass substrates to a thickness of 200 nm. The ITO films were patterned by photolithography and etching to form ITO electrodes. Then, a polyimide alignment film material ("RN7492" manufactured by Nissan Chemical Industries, Ltd.) was applied to the substrates by spin coating so as to cover the ITO electrodes, followed by curing in a thermostatic chamber at 180° C. for one hour, thus forming alignment films.

The alignment films on the substrates were rubbed with a rubbing cloth made of rayon. The rubbing process was performed as follows: a roller wound with the rubbing cloth was rotated close to the substrate that moved in a fixed direction, thereby rubbing the surface of the alignment film in the fixed direction with the pile of the rubbing cloth. As the rubbing conditions, the number of revolutions of the roller was 600 rpm, the traveling speed of the substrate was 20 mm/s, the roller radius was 75 mm, and the amount of indentation was 0.5 mm. That is, the rubbing density was 35000 $mm^2$.

The two substrates were opposed to each other via a spacer (manufactured by Fine Chemicals Division, Sekisui Chemical Co., Ltd.), and the edges were sealed with a sealing resin ("STRUCTBOND 352A" manufactured by Mitsui Chemicals, Inc.), thus producing a cell. In the cell, a space between the substrates was 6.5 $\mu$m.

Next, liquid crystals ("MJ96435" manufactured by Merck Ltd., refractive index anisotropy $\Delta n=0.138$) were injected into the cell by vacuum injection. Thus, a liquid crystal cell 1A was obtained.

In the liquid crystal cell 1A, the pretilt angle of liquid crystal molecules at the interface with each alignment film was measured by a crystal rotation method (this method was used in the following examples and comparative examples).

The pretilt angle at one substrate was 3 to 3.2 degrees and the pretilt angle at the other substrate was 3.2 to 3.5 degrees.

A polarizing plate was bonded to both surfaces of the liquid crystal cell 1A, a 20 V rectangular wave was applied across the electrodes of the liquid crystal cell 1A, and the transition from a splay orientation to a bend orientation was observed. The result showed that the entire electrode region was changed from the splay orientation to the bend orientation after about one second. The polarizing plates were arranged so that an angle between the polarization axis and the rubbing direction was 45 degrees, and the directions of the respective polarization axes crossed at right angles.

Further, a voltage of 1V was applied across the electrodes of the liquid crystal cell 1A. Then, the ratio of the region in the up-splay state to the region in the down-splay state was evaluated. It was confirmed that the two regions were present in substantially equal proportions. The evaluation was performed by observing the liquid crystal cell from the direction that was inclined by 30° toward the rubbing direction from the front and comparing the area ratio of domains in two different colors.

As a comparative example, a liquid crystal cell 1R was produced in the same manner as described above except that the amount of indentation was 0.2 mm and the traveling speed of the substrate was 60 mm/s when the alignment films were rubbed. That is, the rubbing density was 4700 mm2 in the comparative example.

In the liquid crystal cell 1R, the pretilt angle of liquid crystal molecules at the interface with each alignment film was measured. The pretilt angle at one substrate was 4 to 5 degrees and the pretilt angle at the other substrate was 5 to 6 degrees.

Like the working example, a polarizing plate was bonded to both surfaces of the liquid crystal cell 1R, a 20 V rectangular wave was applied across the electrodes, and the transition from a splay orientation to a bend orientation was observed. However, the entire electrode region was not changed from the splay orientation to the bend orientation even after about 10 seconds.

Example 2-1

A liquid crystal cell having the same configuration as that shown in FIG. 4 was produced in the following manner.

Figure 5A:
FIG. 5 is a flow chart illustrating a method for forming a convex structure in a liquid crystal display of Embodiment 1-2.
Figure 5B:
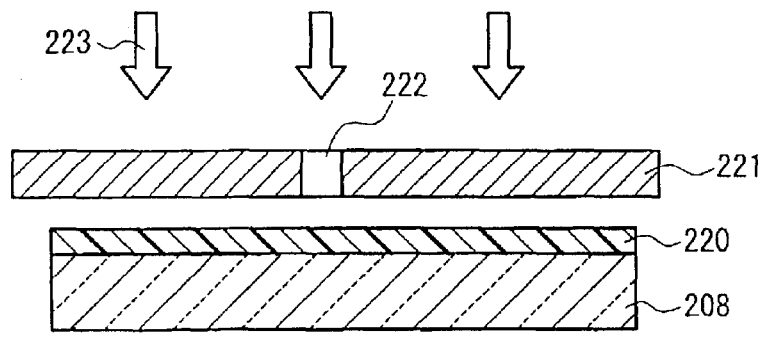
Figure 5C:
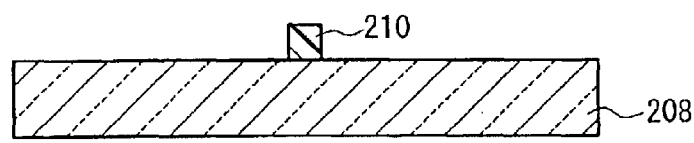
Figure 6:
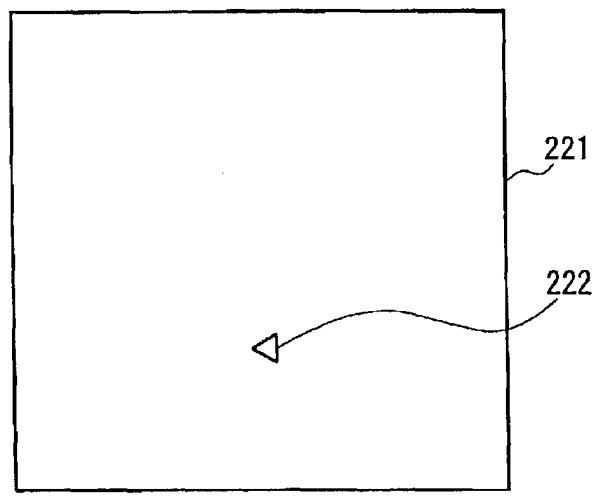
FIG. 6 is a plan view showing a mask pattern used in a method for forming a convex structure in a liquid crystal display of Embodiment 1-2.

A convex structure was formed on a glass substrate (referred to as "a first substrate" in the following). FIG. 5 is a flow chart illustrating the process of forming the convex structure. A PC resist material (manufactured by JSR Corporation) was applied to a first substrate 208, and a resist thin film 220 having a thickness of 0.5 $\mu$m was formed (FIG. 5A). Then, the resist thin film 220 was irradiated with parallel ultraviolet rays 223 through a photomask 221 provided with a triangular opening 222 (FIG. 5B). FIG. 6 shows a mask pattern of the photomask 221. The resist thin film 220 exposed to the parallel light was developed and cleaned, which then was pre-baked at 90° C., thus forming a convex structure 210 in the form of a triangular prism (FIG. 5C).

Next, an indium tin oxide (referred to as "ITO" in the following) film was deposited on the first substrate to a thickness of 200 nm so as to cover the convex structure. The ITO film was patterned by photolithography and etching to form an ITO electrode. Then, a polyimide alignment film material ("SE-7992" manufactured by Nissan Chemical Industries, Ltd.) was applied to the first substrate by spin coating so as to cover the ITO electrode, followed by curing in a thermostatic chamber at 180° C. for one hour, thus forming an alignment film.

Another glass substrate (referred to as "a second substrate" in the following) was prepared, and an ITO electrode was formed on the surface of the second substrate. Then, a polyimide alignment film material ("SE-7492" manufactured by Nissan Chemical Industries, Ltd.) was applied to the second substrate by spin coating so as to cover the ITO electrode, followed by curing in a thermostatic chamber at 180° C. for one hour, thus forming an alignment film.

Figure 7:
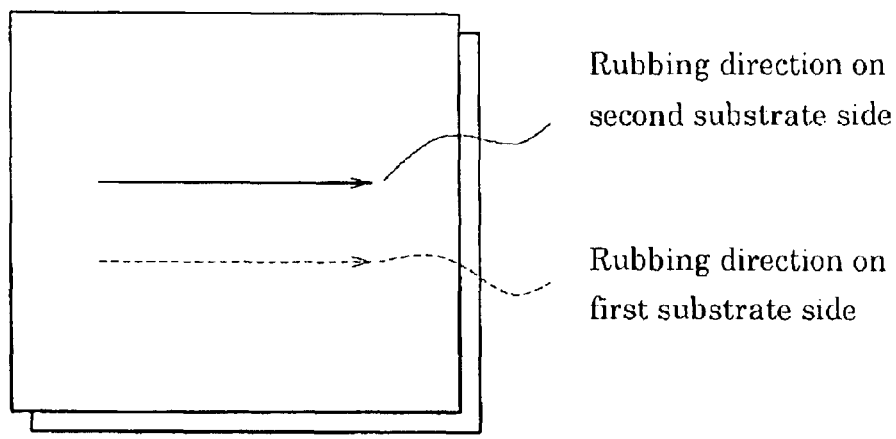
FIG. 7 illustrates the direction of rubbing process on an alignment film or a substrate in examples of the present invention.

The alignment films on the first and second substrates were rubbed with a rubbing cloth made of rayon. At this time, the rubbing direction on the first substrate was equal to that on the second substrate, as shown in FIG. 7. The rubbing conditions were the same as those in Example 1 except that the amount of indentation was 0.3 mm. In this case, the rubbing density was 21000 mm$^2$.

The two substrates were opposed to each other via a spacer (manufactured by Fine Chemicals Division, Sekisui Chemical Co., Ltd.), and the edges were sealed with a sealing resin ("STRUCTBOND 352A" manufactured by Mitsui Chemicals, Inc.), thus producing a cell. In the cell, a space between the substrates was 6.5 $\mu$m.

Next, liquid crystals ("MJ96435" manufactured by Merck Ltd., refractive index anisotropy $\Delta$n=0.138) were injected into the cell by vacuum injection. Thus, a liquid crystal cell 2A was obtained.

In the liquid crystal cell 2A, the pretilt angle of liquid crystal molecules at the interface with each alignment film was measured. The pretilt angle at the first substrate was 2.5 degrees and the pretilt angle at the second substrate was 3.5 degrees.

A polarizing plate was bonded to both surfaces of the liquid crystal cell, a 7 V rectangular wave was applied across the electrodes of the liquid crystal cell 2A, and the transition from a splay orientation to a bend orientation was observed. The result showed that the entire electrode region was changed from the splay orientation to the bend orientation after about three seconds. The polarizing plates were arranged so that an angle between the polarization axis and the rubbing direction was 45 degrees, and the directions of the respective polarization axes crossed at right angles.

In this example, the ITO electrode was formed after the convex structure was formed on the substrate. However, the transition time from the splay orientation to the bend orientation was about the same even if the convex structure was formed on the substrate provided with the ITO electrode.

According to this example, the application of a voltage causes the position of the liquid crystal molecules orienting parallel to the substrate planes to shift quickly to the surface of the substrate (first substrate) at which the pretilt angle is low. Moreover, it is estimated that the splay out is assisted by the effect of the convex structure, and thus a quick and reliable bend transition can be achieved.

Example 2-2

A liquid crystal cell having the same configuration as that shown in FIG. 8 was produced in the following manner.

An ITO electrode was formed on a glass substrate (referred to as "a first substrate" in the following). Then, a polyimide alignment film material ("SE-7992" manufactured by Nissan Chemical Industries, Ltd.) containing 3 wt % of alumina powder having a diameter of 0.3 $\mu$m was applied to the first substrate by spin coating so as to cover the ITO electrode, followed by curing in a thermostatic chamber at 180° C. for one hour, thus forming an alignment film.

Another glass substrate (referred to as "a second substrate" in the following) was prepared, and an ITO electrode was formed on the surface of the second substrate. Then, a polyimide alignment film material ("SE-7492" manufactured by Nissan Chemical Industries, Ltd.) was applied to the second substrate by spin coating, followed by curing in a thermostatic chamber at 180° C. for one hour, thus forming an alignment film.

The first and second substrates were rubbed in the same manner as Example 2-1. By using these substrates, a liquid crystal cell 2B was produced.

In the liquid crystal cell 2B, the pretilt angle of liquid crystal molecules at the interface with each alignment film was measured. The pretilt angle at the first substrate was 3.0 degrees and the pretilt angle at the second substrate was 3.5 degrees.

Like Example 2-1, a polarizing plate was bonded to both surfaces of the liquid crystal cell 2B, a 7 V rectangular wave was applied across the electrodes, and the transition from a splay orientation to a bend orientation was observed. The result showed that the entire electrode region was changed from the splay orientation to the bend orientation after about five seconds.

According to this example, the application of a voltage causes the position of the liquid crystal molecules orienting parallel to the substrate planes to shift quickly to the surface of the substrate (first substrate) at which the pretilt angle is low. Moreover, it is estimated that the splay out is assisted by the effect of the surface of alumina powder that is rubbed in a three-dimensional manner, and thus a quick and reliable bend transition can be achieved.

Example 2-3

A liquid crystal cell having the same configuration as that shown in FIG. 9 was produced in the following manner.

A pixel electrode, a nonlinear element, a source line, and a gate line were formed on a glass substrate (referred to as "a first substrate" in the following). A thin film transistor having a thickness of about 200 nm was used as the nonlinear element. An ITO electrode was used as the pixel electrode. Then, a polyimide alignment film material ("AL-1052" manufactured by JSR Corporation) was applied to the first substrate by spin coating, followed by curing in a thermostatic chamber at 180° C. for one hour, thus forming an alignment film.

An ITO electrode was formed on another glass substrate (referred to as "a second substrate" in the following) as a counter electrode. Then, a polyimide alignment film material ("AL-1052" manufactured by JSR Corporation) was applied to the second substrate by spin coating, followed by curing in a thermostatic chamber at 180° C. for one hour, thus forming an alignment film.

The first and second substrates were rubbed in the same manner as Example 2-1. By using these substrates, a liquid crystal cell 2C was produced.

In the liquid crystal cell 2C, the pretilt angle of liquid crystal molecules at the interface with each alignment film was measured. The pretilt angle at the first substrate was 4.0 degrees and the pretilt angle at the second substrate was 4.5 degrees.

In this example, the alignment films formed respectively on the first and second substrates were made of the same material. However, there was a convex portion of about 200 nm on the surface of the first substrate because of the presence of the nonlinear element. Therefore, the friction coefficient in the rubbing process was large, and the effective rubbing strength was increased. Thus, the pretilt angle was considered to be smaller.

Like Example 2-1, a polarizing plate was bonded to both surfaces of the liquid crystal cell 2C, a 7 V rectangular wave was applied across the electrodes, and the transition from a splay orientation to a bend orientation was observed. The result showed that the entire electrode region was changed from the splay orientation to the bend orientation after about three seconds.

In this example, it is estimated that the splay-bend transition is accelerated by the effects of unevenness on the substrate surface and a transverse electric field generated between the gate line and the pixel electrode.

Example 2-4

A liquid crystal cell having the same configuration as that shown in FIG. 14 was produced in the following manner.

An ITO electrode was formed on a glass substrate (referred to as "a first substrate" in the following). Then, a polyimide alignment film material ("JALS-612" manufactured by JSR Corporation) was applied to the first substrate by spin coating, followed by curing in a thermostatic chamber at 180° C. for one hour, thus forming an alignment film. The first substrate was rubbed under the following conditions: the number of revolutions of the roller was 600 rpm, the traveling speed of the substrate was 20 mm/s, the roller radius was 65 mm, and the amount of indentation was 0.5 mm. That is, the rubbing density was 21000 mm$^2$.

Another glass substrate (referred to as "a second substrate" in the following) was prepared. An ITO electrode and an alignment film were formed on the second substrate by the same operations as those for the first substrate. The second substrate was rubbed under the same conditions as those described above except that the amount of indentation was 0.3 mm.

The rubbing process was performed with a rubbing cloth made of rayon so that the rubbing direction on the first substrate was equal to that on the second substrate, as shown in FIG. 5.

By using the first and second substrates, five cells were produced in the same manner as Example 2-1. As shown in Table 1, liquid crystal materials having different twist elastic constants $k_{22}$ were injected into the respective cells by vacuum injection. Thus, five liquid crystal cells 2D to 2H were obtained.

In each of the liquid crystal cells, the pretilt angle of liquid crystal molecules at the interface with each alignment film was measured. The measurement showed that all the liquid crystal cells had substantially the same value. For example, the pretilt angles in the liquid crystal cell 2D were 4.5 degrees at the first substrate and 5.3 degrees at the second substrate.

Like Example 2-1, a polarizing plate was bonded to both surfaces of each of the liquid crystal cells 2D to 2H, a 7V rectangular wave was applied across the electrodes, and the transition from a splay orientation to a bend orientation was observed. Table 1 shows the results.

TABLE 1

| Liquid crystal cell | Liquid crystal material | Twist elastic constant $k_{22}$ [pN] | Bend transition time [sec] |
|---|---|---|---|
| 2D | LC-1 | 6.3 | 5 |
| 2E | LC-2 | 8.7 | 7 |
| 2F | LC-3 | 9.2 | 9 |
| 2G | LC-4 | 10.3 | 10 |
| 2H | LC-5 | 12.5 | 17 |

Table 1 proves that the liquid crystal cells of this example make a high-speed bend transition possible.

Example 2-6

A liquid crystal cell having the same configuration as that shown in FIG. 14 was produced in the following manner.

A mixture of a compound and a solvent (N-methyl-2-pyrrolidone) was applied to a glass substrate (referred to as "a first substrate in the following) by spin coating, followed by curing in a thermostatic chamber at 180° C. for one hour, thus forming an alignment film. The compound is expressed by the following formula.

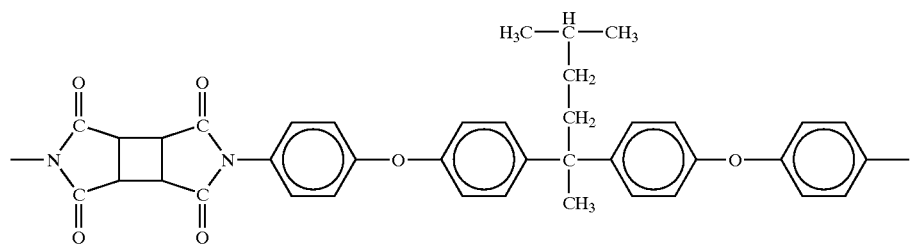

Another glass substrate (referred to as "a second substrate" in the following) was prepared, and an ITO electrode was formed on the second substrate. Then, a polyimide alignment film material ("SE-7492" manufactured by Nissan Chemical Industries, Ltd.) was applied to the second substrate by spin coating, followed by curing in a thermostatic chamber at 180° C. for one hour, thus forming an alignment film.

The first and second substrates were rubbed in the same manner as Example 2-1. By using these substrates, a liquid crystal cell 2K was produced.

In the liquid crystal cell 2K, the pretilt angle of liquid crystal molecules at the interface with each alignment film was measured. The pretilt angle at the first substrate was 2.2 degrees and the pretilt angle at the second substrate was 4.3 degrees.

Like Example 2-1, a polarizing plate was bonded to both surfaces of the liquid crystal cell 2K, a 7 V rectangular wave was applied across the electrodes, and the transition from splay orientation to a bend orientation was observed. The result showed that the entire electrode region was changed from the splay orientation to the bend orientation after about six seconds.

According to this example, the alignment film on the first substrate includes asymmetric carbon atoms, which can impart a twist effect to the adjacent liquid crystal molecules. Thus, it is considered to stimulate the splay out.

Comparative Example 2-1

Two glass substrates were prepared, and an ITO electrode was formed on each of the glass substrates. Then, a poly-imide alignment film material ("SE-7492" manufactured by Nissan Chemical Industries, Ltd.) was applied to the substrates by spin coating, followed by curing in a thermostatic chamber at 180° C. for one hour, thus forming alignment films.

The two substrates were rubbed in the same manner as Example 1. By using these substrates, a liquid crystal cell R was produced.

In the liquid crystal cell R, the pretilt angle of liquid crystal molecules at the interface with each alignment film was measured. The pretilt angle at one substrate was substantially equal to the pretilt angle at the other substrate, i.e., about 7 degrees.

Like Example 2-1, a polarizing plate was bonded to both surfaces of the liquid crystal cell 2R, a 7 V rectangular wave was applied across the electrodes, and the transition from a splay orientation to a bend orientation was observed. The result showed that the entire electrode region was changed from the splay orientation to the bend orientation after about 10 seconds.

Example 3-1

A liquid crystal display having the same configuration as that shown in FIG. 15 was produced in the following manner.

Two glass substrates were prepared, each of which had a matrix configuration and was provided with a transparent electrode. Then, a polyimide alignment film material ("SE-7792" manufactured by Nissan Chemical Industries, Ltd., containing 6% solid component) was applied to the glass substrates, followed by curing in a thermostatic chamber at 200° C. for one hour, thus forming alignment films. The thickness of the polyimide alignment films was about 100 nm. Only one of the substrates (referred to as "a front side substrate" in the following) was rubbed with a rubbing cloth made of rayon under the following conditions: the number of revolutions of the roller was 600 rpm, the traveling speed of the substrate was 20 mm/s, the roller radius was 65 mm, and the amount of indentation was 0.3 mm.

Using a spacer (manufactured by Nippon Shokubai Co., Ltd.) and a sealing resin ("STRUCTBOND XN-21-S" manufactured by Mitsui Chemicals, Inc.), the substrates were bonded together so that a space between the substrates was 6.5 μm and the matrix of the upper substrate was orthogonal to that of the lower substrate, thus producing a cell.

Next, a liquid crystal material ("MJ96435" manufactured by Merck Ltd.) was injected into the cell by vacuum injection, which then was sealed with a sealing resin ("352A" manufactured by Henkel Japan Ltd., Loctite Division, ultraviolet curable resin).

A polarizing plate was bonded to the front side substrate so that the angle between the polarization axis and the rubbing direction of the alignment film was 45 degrees, and then a film phase difference plate was bonded to the polarizing plate at a desired angle. Only a reflecting plate was bonded to the other substrate (referred to as "a rear side substrate" in the following). Thus, a test cell 3A was produced.

A test cell 3B was produced in the same manner as the test cell 3A except that a vertical alignment film ("RN-768" manufactured by Nissan Chemical Industries, Ltd., containing 6% solid component) having a thickness of about 50 nm was used as the alignment film on the rear side substrate.

As a comparative example, a test cell 3R-1 was produced in the same manner as the test cell 3B except that the thickness of the vertical alignment film on the rear side substrate was about 100 nm.

A 6 V static waveform was applied to each of the test cells at room temperature, and a checkerboard pattern image was displayed continuously for 24 hours. Then, the whole cell was turned on to observe display anomalies in the continuously displayed portion. The 24-hour display and the subsequent observation were performed as a cycle. Table 2 shows the results of visual observation for each test cell display.

TABLE 2

| Number of cy-cles | Test cell | | |
|---|---|---|---|
| | 3A | 3B | 3R-1 |
| 0 | no display anomaly | no display anomaly | no display anomaly |
| 1 | no display anomaly | no display anomaly | clear residual image |
| 2 | no display anomaly | no display anomaly | clear residual image |
| 3 | no display anomaly | no display anomaly | clear residual image |
| 4 | no display anomaly | no display anomaly | clear residual image |
| 5 | no display anomaly | no display anomaly | clear residual image |
| 6 | no display anomaly | no display anomaly | clear residual image |
| 7 | no display anomaly | faint residual image | clear residual image |
| 8 | no display anomaly | faint residual image | clear residual image |
| 9 | no display anomaly | faint residual image | clear residual image |
| 10 | no display anomaly | faint residual image | clear residual image |

As can be seen from Table 2, the test cell 3R-1 caused a strong residual image only after 1 cycle. The test cell 3A did not cause a residual image even after 10 cycles. The test cell 3B caused no residual image until 6 cycles.

It was considered that the occurrence of a residual image in the test cell 3R-1 was due to electrical asymmetry resulting from the use of different alignment films. In the test cell 3B, however, the thickness of the alignment film on the rear side substrate was adjusted to about 60% of the thickness of the alignment film on the front side substrate, so that the capacitance was balanced between the two alignment films. Thus, the length of time before the occurrence of a residual image was increased as compared with the test cell 3R-1. This confirmed that an improvement in electrical symmetry enabled a significant improvement in reliability.

Example 3-2

A liquid crystal display having the same configuration as that shown in FIG. 15 was produced in the following manner.

Two glass substrates were prepared, each of which had a matrix configuration and was provided with a transparent electrode. Then, a polyimide alignment film material ("RN-768" manufactured by Nissan Chemical Industries; Ltd., achieving a pretilt angle of about 40°) was applied to the glass substrates, followed by curing in a thermostatic chamber at 200° C. for one hour, thus forming alignment films. Only one of the substrates (referred to as "a front side substrate" in the following) was rubbed and irradiated with ultraviolet rays having a relatively short wavelength of less than 300 nm. In this case, the integrated irradiation was 2000 mJ, and the rubbing conditions were as follows: the number of revolutions of the roller was 600 rpm, the traveling speed of the substrate was 20 mm/s, the roller radius was 65 mm, and the amount of indentation was 0.3 mm.

By using these substrates, a test cell 3C was produced in the same manner as Example 3-1. In the test cell 3C, it was confirmed that the pretilt angle at the front side substrate, which was irradiated with ultraviolet rays, was smaller than the pretilt angle at the other substrate (referred to as "a rear side substrate" in the following).

The display characteristics of the test cell 3C were observed and evaluated in the same manner as Example 3-1. Table 3 shows the results.

TABLE 3

| Number of cycles | Test cell 3C |
|---|---|
| 0 | no display anomaly |
| 1 | no display anomaly |
| 2 | no display anomaly |
| 3 | no display anomaly |
| 4 | no display anomaly |
| 5 | no display anomaly |
| 6 | no display anomaly |
| 7 | no display anomaly |
| 8 | no display anomaly |
| 9 | no display anomaly |
| 10 | no display anomaly |

As can be seen from Table 3, no residual image was caused in this example even after 10 cycles, like the test cell 3A in Example 3-1.

Example 3-3

Two glass substrates were prepared, each of which had a matrix configuration and was provided with a transparent electrode. Then, a polyimide alignment film was formed on each of the glass substrates in the same manner as Example 3-1. A water-repellent surface-active agent ("MFS-17" manufactured by Shin-Etsu Chemical Co., Ltd.) was applied to the alignment film on one of the substrates (referred to as "a rear side substrate" in the following) so as to have a thickness of 20 nm, which then was dried at 120° C.

By using the two substrates, a test cell 3D was produced in the same manner as Example 3-1. The display characteristics of the test cell 3D were observed and evaluated in the same manner as Example 3-1. Table 4 shows the results.

TABLE 4

| Number of cycles | Test cell 3D |
|---|---|
| 0 | no display anomaly |
| 1 | no display anomaly |
| 2 | no display anomaly |
| 3 | no display anomaly |
| 4 | no display anomaly |
| 5 | no display anomaly |
| 6 | no display anomaly |
| 7 | no display anomaly |
| 8 | faint residual image |
| 9 | faint residual image |
| 10 | faint residual image |

As can be seen from Table 4, the test cell 3D maintained good display quality until 7 cycles, though a faint residual image was caused from 8 cycles.

Example 3-4

A liquid crystal display having the same configuration as that shown in FIG. 15 was produced in the following manner.

A silicon nitride film having a thickness of about 100 nm was formed on a glass substrate that had a matrix configuration and was provided with a transparent electrode (this substrate is referred to as "a rear side substrate" in the following). A polyimide alignment film material ("SE-7792" manufactured by Nissan Chemical Industries, Ltd.) was applied to the silicon nitride film on the rear side substrate, followed by curing in a thermostatic chamber at 200° C. for one hour, thus forming an alignment film. The same polyimide alignment film material was applied to another glass substrate provided with a transparent electrode, followed by curing in the thermostatic chamber at 200° C. for one hour, thus forming an alignment film (this substrate is referred to as "a front side substrate" in the following).

By using these substrates, test cells were produced in the same manner as Example 3-1. As shown in Table 5, four test cells (3E to 3H) were produced under the conditions that the thickness of the alignment film on the front side substrate was fixed to about 100 nm, while varying the thickness of the alignment film on the rear side substrate, such as 10 nm, 30 nm, 60 nm and 90 nm. The display characteristics of the test cells 3E to 3H were observed and evaluated in the same manner as Example 3-1. Table 5 shows the results.

TABLE 5

| Number of cycles | Test cell | |
|---|---|---|
| | 3E (10 nm) | 3F (30 nm) |
| 0 | no display anomaly | no display anomaly |
| 1 | no display anomaly | no display anomaly |
| 2 | no display anomaly | no display anomaly |
| 3 | no display anomaly | no display anomaly |
| 4 | no display anomaly | no display anomaly |
| 5 | no display anomaly | no display anomaly |
| 6 | no display anomaly | no display anomaly |
| 7 | faint residual image | no display anomaly |
| 8 | faint residual image | no display anomaly |
| 9 | faint residual image | no display anomaly |
| 10 | faint residual image | no display anomaly |
| | 3G (60 nm) | 3H (90 nm) |
| 0 | no display anomaly | no display anomaly |
| 1 | no display anomaly | no display anomaly |
| 2 | no display anomaly | no display anomaly |
| 3 | no display anomaly | no display anomaly |
| 4 | faint residual image | faint residual image |
| 5 | faint residual image | faint residual image |
| 6 | faint residual image | faint residual image |
| 7 | faint residual image | faint residual image |
| 8 | faint residual image | faint residual image |
| 9 | faint residual image | faint residual image |
| 10 | faint residual image | faint residual image |

As can be seen from Table 5, the test cell 3F exhibited the most favorable display characteristics, followed by the test cell 3E. The reason for this was considered that the test cell 3F had the smallest electrical asymmetry because use the capacitance of the alignment film on the front side substrate was equal to that of the insulating film and the alignment film on the rear side substrate. The test cell 3E was considered to have the smallest electrical asymmetry after the test cell 3F.

Industrial Applicability

An embodiment of a liquid crystal display of the present invention allows a liquid crystal display, in which the orientation of liquid crystal molecules in a liquid crystal layer is changed from a splay orientation to a for display by application of a voltage to the liquid crystal layer, to achieve a quick and reliable transition to the bend orientation by applying a relatively low voltage. Therefore, when the present invention is applied, e.g., to an OCB-type liquid crystal display, the display can have quick response and a shorter initialization time to start display. Thus, it can be used widely in applications, such as the display portions of cellular phones and portable terminals.

Another embodiment of a liquid crystal display of the present invention allows a liquid crystal display, in which the absolute value of a pretilt angle in the vicinity of one substrate differs from the absolute value of a pretilt angle in the vicinity of the other substrate, to suppress the occurrence of a residual image or the like and achieve high image quality. Therefore, when the present invention is applied, e.g., to a R-OCB-type liquid crystal display, the display can have quick response and good image quality. Thus, it can be used widely in applications, such as the display portions of cellular phones and portable terminals.

What is claimed is:

1. A liquid crystal display comprising:

two opposed substrates; and a liquid crystal layer sandwiched between the substrates, the liquid crystal layer comprising liquid crystal molecules whose orientation is changed from a splay orientation to a bend orientation for display by applying a voltage of not less than a threshold voltage to the liquid crystal layer, wherein application of a voltage of less than the threshold voltage to the liquid crystal layer allows the liquid crystal layer to have a region where the liquid crystal molecules having a molecular axis parallel to the substrates predominantly lie on one substrate side with respect to a central portion of the liquid crystal layer and a region where those liquid crystal molecules predominantly lie on the other substrate side with respect to the central portion, and the two regions are present in substantially equal proportions.

2. The liquid crystal display according to claim 1, wherein an area ratio (U:D) of the region (U) where the liquid crystal molecules having the molecular axis parallel to the substrates predominantly lie on one substrate side with respect to the central portion of the liquid crystal layer to the region (D) where those liquid crystal molecules predominantly lie on the other substrate with respect to the central portion is 40:60 to 60:40 when a voltage of less than the threshold voltage is applied to the liquid crystal layer.

3. The liquid crystal display according to claim 1, wherein at least one of the substrates is provided with a bend transition nucleus induction means.

4. The liquid crystal display according to claim 3, wherein the bend transition nucleus induction means is a convex structure formed on the at least one of the substrates.

5. The liquid crystal display according to claim 4, wherein the convex structure is a spherical structure or a columnar structure formed on the at least one of the substrates.

6. The liquid crystal display according to claim 4, wherein the convex structure is a nonlinear element formed on the at least one of the substrates.

7. The liquid crystal display according to claim 3, wherein the bend transition nucleus induction means is a concave structure formed on the at least one of the substrates.

8. The liquid crystal display according to claim 3, wherein the bend transition nucleus induction means is an electric field application means for applying a transverse electric field to the liquid crystal layer.

9. The liquid crystal display according to claim 3, wherein the bend transition nucleus induction means causes a twisted orientation in a portion of the liquid crystal layer.

10. The liquid crystal display according to claim 1, which is an OCB-type liquid crystal display.

11. A method for manufacturing a liquid crystal display, the liquid crystal display comprising two opposed substrates and a liquid crystal layer sandwiched between the substrates, the liquid crystal layer comprising liquid crystal molecules whose orientation is changed from a splay orientation to a bend orientation for display by applying a voltage of not less than a threshold voltage to the liquid crystal layer;

the method comprising:

an inspection process after producing the liquid crystal display, wherein the inspection process is performed by applying a voltage of less than the threshold voltage to the liquid crystal layer and evaluating an area ratio of a region where the liquid crystal molecules having a molecular axis parallel to the substrates predominantly lie on one substrate side with respect to a central portion of the liquid crystal layer to a region where those liquid crystal molecules predominantly lie on the other substrate side with respect to the central portion.

12. The method according to claim 11, wherein a liquid crystal display having a substantially equal area ratio is recognized as an acceptable product in the inspection process.

13. The method according to claim 11, wherein the liquid crystal display is an OCB-type liquid crystal display.

* * * * *